United States Patent [19]
Sunstein

[11] 3,893,165

[45] July 1, 1975

[54] ELECTRICALLY-CONTROLLED IMAGE-DISPLAY SYSTEM AND METHOD, AND APPARATUS SUITABLE FOR USE THEREIN

[76] Inventor: David E. Sunstein, 9 Warton Rd., Nashua, N.H. 03060

[22] Filed: Mar. 13, 1973

[21] Appl. No.: 340,669

[52] U.S. Cl. .......................... 358/67; 358/71

[51] Int. Cl. .......................... H04n 9/24

[58] Field of Search .......................... 178/5.4 F, 5.4 H; 315/5.34, 21 C, 5.24, 5.35, 31 R, 31 TV; 358/64, 71, 67; 313/64

[56] References Cited

UNITED STATES PATENTS

| | | | |
|---|---|---|---|
| 2,967,210 | 1/1961 | Kell | 178/5.4 |
| 3,109,886 | 11/1963 | Boothroyd | 178/5.4 |
| 3,204,024 | 8/1965 | Keizer | 178/5.4 |

*Primary Examiner*—Richard Murray
*Assistant Examiner*—R. John Godfrey
*Attorney, Agent, or Firm*—Howson and Howson

[57] ABSTRACT

A color-television image-display system of the type using triplets of vertical phosphor stripes and associated index elements scanned horizontally by a cathode-ray beam to reproduce the image, in which the horizontal deflection speed of the beam is modulated at the triplet scanning rate in accordance with the received chrominance information applied to the CRT grid to cause the beam to dwell longer in positions for which more saturated colors are to be produced, and in which the index elements are positioned so that the normal unmodulated horizontal sweep of the beam will scan them at a rate which is an odd integral multiple of one-half the corresponding rate of scanning of the triplets of phosphor stripes, thereby to reduce phase errors in the index signal when the deflection speed is modulated. The amount of deflection-speed modulation is also automatically varied as a function of the particular hue being represented by the chrominance signal, thereby further to reduce tendencies for the deflection-speed modulation to introduce discrepancies in the rendition of the hue and saturation of certain colors; preferably the deflection-speed modulation at the triplet scanning rate is enhanced most when representing primaries, and an increasing amount of deflection-speed modulation at the rate of scanning of the individual stripes is introduced for hues departing further from primaries; at the same time an increasing amount of pulsing on of the CRT beam stripe-scanning frequency is preferably also provided. To accomplish this, circuits are provided for detecting hues at or near primaries and for quantizing the phase of the signal used to produce deflection-speed modulation at the triplet rate. The deflection-speed modulation may be applied to the beam by electrostatic deflection plates or by a small magnetic yoke; to prevent undesirable interaction between the conventional deflection yoke and the microdeflection yoke, the microdeflection yoke may be located at a position partially within the conventional yoke where the net field produced by the conventional yoke in the microdeflection yoke is negligible, and/or special output stages tuned to the deflection-speed modulation signal frequencies may be used to drive the microdeflection yoke. The deflection-speed modulation may also be used advantageously in a black-and-white television tube provided with vertical stripes which are non-responsive to the beam and non-reflective of room light to increase the dwell time of the beam on the beam-responsive portions of the screen, with resultant improvements in overall image brightness for a given average beam current, when compared to the brightness produced by a conventional black-and-white screen with a partially-transparent front faceplate providing the same screen reflectance to room light as does the vertically-striped tube.

30 Claims, 30 Drawing Figures

ELECTRICALLY-CONTROLLED IMAGE-DISPLAY SYSTEM AND METHOD, AND APPARATUS SUITABLE FOR USE THEREIN

BACKGROUND OF THE INVENTION

This invention relates to method and apparatus for the electrically controlled display of images, and especially to color television image-display apparatus and methods.

In one type of electrically-controlled image display system, such as is used for television or numerical or graphical displays and the like, groups of different light-controlling elements, such as differently colored stripes, are scanned transversely by a scanning entity such as a cathode-ray tube beam, to produce a visual image. In such systems used to produce color-images, there is often a problem of providing a sufficient degree of color saturation in the reproduced image at points where saturated colors are to be reproduced. One reason for this difficulty arises from the effective width of the scanning entity, normally the cathode-ray beam which scans the stripes within each group. Frequently these strips are of light-producing phosphor, with each adjacent stripe producing light of a different color, and typically with three such lines making up a group or triplet. If the spot produced by the electron beam is wider than the individual stripes, when a saturated color is to be produced the beam will impinge not only the desired color stripe but also some of the adjacent stripe areas. In such case a fully saturated color cannot be reproduced, since in any given region of the tube it will not be possible to activate only a single line. Even if the beam is narrower than the width of an individual line, the finite duration of time required to turn the beam on and off, taken together with the finite beam width, can cause the beam to activate other than the desired stripe, and some color desaturation can then readily occur.

While some of these difficulties can be reduced by (a) utilization of very small spot sizes and/or (b) very steep drive waveforms to control the intensity of the beam, in general the smaller the spot size the less will be the available peak beam current and the shorter the time the beam is turned on as it scans each triplet, the less will be the beam energy available to activate the stripe elements; hence both attempts to reduce the desaturation will result in a lesser available amount of light output if the stripes are made up of phosphors or light-producing segments. Also the first remedy in general leads to a more expensive and more critical electron gun and deflection yoke, a more expensive high-voltage supply for the cathode-ray tube, and a shorter cathode life; likewise the steep waveforms needed for intensity control in the second remedy (b) above can also lead to extra expense, and may cause interfering radio-frequency radiations to emanate from the signals which drive the cathode-ray tube, or directly from the cathode-ray tube beam itself.

One approach employed previously in an attempt to reduce the effects of these problems has been to employ so-called "guard bands" between adjacent phosphor lines, which guard bands do not respond appreciably to produce light when impinged by the beam. These guard bands reduce the extent to which the beam overlaps adjacent phosphors when it is intended to be acting only upon a given phosphor line. However, such guard bands can reduce the total brightness of the image, typically reducing it on a white portion of the image by as much as 50 percent, which is the case when the guard bands are of the same width as the phosphor stripes.

It has also been proposed to mitigate the above-described problems by modulating the transverse deflection speed of the beam across the phosphor lines with a steady, periodic microdeflection signal at the frequency of scanning of the individual phosphor lines. For example if the groups of color stripes or triplets are scanned at an average speed of 6,000,000 groups per second, the prior proposed microdeflection signal would modulate the speed of scanning at 18 megaHertz (MHz), to cause the beam to dwell at positions centered with respect to each of the three successive phosphor lines within each triplet, and then to move relatively quickly to the center of the next phosphor line, so that the time the beam spends in scanning positions in which it substantially overlaps a pair of adjacent lines is reduced. Such a system is described for example in U.S. Pat. No. 2,778,971 of D. E. Sunstein, issued Jan. 22, 1957. However, this prior system has a number of disadvantages, among which is the disadvantage that for saturated primary colors, the beam must be turned off for at least approximately 66 percent of the time, and therefore the light output is less than could otherwise be obtained if means could be devised to leave the beam on for longer times. With prior systems having guard bands, the beam could in theory be turned on for a greater percentage of the time, even for fairly saturated colors (approaching a theoretical 50 percent of the time if the spot is very small in its horizontal dimension compared to the width of a color stripe), but with the guard bands much of the beam current must be wasted on the black-appearing guard bands; for practical sizes of spots, moreover, the 50 percent theoretical figure could not be realized at desired brightness levels for saturated colors.

In addition, I have found that where the scanned image-display device is of a type employing index elements also scanned by the beam to generate an indexing signal indicative of instantaneous beam position, a further problem arises in that if deflection-speed modulation of the beam is also employed, the indexing signal will in general be adversely influenced by the deflection-speed modulation so that, for substantial amounts of deflection-speed modulation, the phase of the index signal will constitute an unreliable and inaccurate indication of beam position. In systems in which such indexing signals are used to control synchronization between the color-controlling signal and the instantaneous positioning of the beam with respect to each group of lines, substantial degradation of the accuracy of the indexing signal will prevent proper rendition of the colors in the image. For example, the above-cited U.S. Pat. No. 2,778,971 discloses use of index elements between each adjacent pair of phosphor lines to generate the index signal in a tube using triplets of red, green and blue phosphor stripe elements. I have now found that, in such a tube, deflection modulation at the frequency of scanning color elements will produce a systematic change in index signal phase to an extent dependent upon the phase and magnitude of the deflection modulation, which can quite readily cause not only improper color rendition, but even loop instability. British Pat. No. 793,351, published Apr. 16, 1958 and issued to Sylvania-Thorn Colour Television Laboratories Limited, describes a color television image-display system of the type using vertical groups of contiguous red, green and blue phosphors transversely scanned by the beam, the scanning being deflection-speed modulated by the chrominance signal so that the stripes to be more strongly activated by the beam are more slowly scanned. Radiations from one of the stripes of each triplet are used to produce an indexing signal which is phase-compared with a received color burst to produce a control signal for servoing or "slaving" the mean beam-deflection speed to the proper rate. The chrominance signal is used only for deflection-speed modulation to add color to the image, and is not applied to the cathode-ray tube grid.

The system of British Pat. No. 793,351 suffers first from the fact that, since one of the phosphor lines is used for indexing, the phase of the index signal will vary strongly with the phase and amplitude of the deflection modulation, which in turn will produce serious errors in image color, and even loop instability. The rendition of colors other than primaries and complements will also tend to vary somewhat with beam spot size. In addition, so far as is known, the servoing of mean deflection speed with the necessary accuracy by the method proposed in the patent is believed not to be commercially possible and also will result in lack of proper deflection control at the beginning of each horizontal deflection line while the deflection servo is attempting to achieve lock-in.

U.S. Pat. No. 3,431,456, entitled "Three Beam Color Television Deflection System," issued Mar. 4, 1969, to A. Liebscher describes a system in which three different cathode-ray beams are intended simultaneously to impinge the centers of three corresponding respective color stripes in each triplet, the set of three beams being abruptly deflected or jerked horizontally from its position for actuating one triplet to its position for actuating the next triplet, in steps equal to the triplet width. This system requires three beams accurately tracking each other over the screen of the tube, which is very difficult, expensive, and critical to accomplish if it can be done at all; in addition, Liebscher uses a "fundamental" index system involving one index element per triplet, which will not produce satisfactory index in the present of the severely non-linear horizontal deflection which Liebscher proposes.

Accordingly, it is an object of my invention to provide a new and useful image display system.

Another object is to provide such a system which makes possible better rendition of saturated colors.

Another object is to provide a color-image display system capable of producing more light output on colored parts of the image.

Another object is to reduce loss of light output while the beam scans guard lines in a color television tube.

Another object is to allow the use of relatively low frequency drive signals for the beam intensity control of an index type color television tube even on relatively highly saturated parts of the picture.

Another object is to reduce the cost of image display systems, particularly those of the type that are used in color television reception.

Another object is to improve the performance of such image display devices.

Another object is to allow the use of spots widths occupying a relatively larger percent of the triplet pitch, while still enabling the reproduction of highly saturated colors, thereby allowing more beam current, for a brighter saturated color picture, or less expensive electron-gun, and/or high voltage supply, and/or yoke.

Another object is to allow the beam to be turned on for a greater fraction of the triplet period than previously, while nevertheless presenting relatively saturated colors, thereby allowing the use of less peak beam current for a given picture brightness, and thereby allowing a smaller spot size for given picture brightness and a finer, less visible color triplet structure.

Another object is to provide highly saturated color display of images, at high brightness, while enabling a finer, less visable color stripe triplet.

Another object is to permit savings in the cost of manufacture of a color cathode-ray tube by eliminating the need to lay down guard stripes on the screen of the tube.

Another object is to provide a deflection-speed modulation index type of image display system in which the indexing signal is accurate and reliable even for relatively large amounts of deflection-speed modulation.

Another object is to provide such a system in which adverse effects of beam spot size changes on the accurate rendition of colors intermediate to primaries and complements are substantially reduced.

Another object is to provide such a system when employing guard bands between at least some of the color elements, in which the rendition of complement colors is substantially improved.

Another object of the invention is to allow the presentation of relatively saturated colored images without requiring a high percentage of beam current modulation with chrominance information.

Another object of the invention is to provide an index structure and indexing system which can still keep accurate track of relative location of the beam with respect to the groups of color stripes, despite the fact that the beam is moving at an uneven varying rate modulated within each portion of each group of stripes.

Another object of the invention is to provide means for causing the beam to dwell for a relatively-longer fraction of the total triplet scan time on stripes corresponding to primary colors to be reproduced when the chrominance signal calls for primary colors to be reproduced, and to spend a relatively lesser time on each phosphor stripe when other than primary colors are to be reproduced.

Another object of the invention is to provide means using chrominance-representing signals to control scan deflection-speed in a manner to produce high-quality color images having colors dependent upon the chrominance control signals and enhanced by changes of sweep speed occurring while the color phosphors are being scanned.

Another object of the invention is to create a microdeflection control signal which has a maximum effect on scanning velocity on highly saturated primary colors.

Another object of the invention is to create a microdeflection control signal which has a maximum strength on saturated primary colors, and which has a lesser strength on pure complementary colors.

Another object of the invention is to allow highly saturated, bright images, with index-type cathode-ray tubes having reduced loading of the cathode in terms of current density required at the cathode.

Another object of the invention is to prolong cathode life in index type color cathode-ray tubes.

It is also an object to provide such an improved color television image display system in which the microdeflection signals exert their desirable effects primarily when they are needed to reproduce colors, without producing substantial detracting or complicating effects when white or pastel colors are being produced.

SUMMARY OF THE INVENTION

In accordance with the invention, there is providd an electrically-controlled image-display system comprising image-forming means including a plurality of similar groups of elements of different light-controlling characteristics, means for scanning said groups with a scanning entity to activate said elements in a manner to form an image, index means positioned to be scanned by said scanning entity during formation of said image to produce index signals representative of the position of said scanning entity, and means for producing variations in the speed of said scanning of at least one of said groups to cause said entity to scan one position in said one group more slowly than other positions in said group, said indexing elements being positioned so that the phase of said index signals averaged over the time of said scanning of several of said groups is not substantially adversely affected by said scanning-speed variations. Preferably, said index elements are positioned so as to be scanned by said scanning entity at a frequency which is M/N times the frequency of scanning of said groups in the absence of said variations in scanning speed, where N and M are integers and M is greater than N and other than an integral multiple of N. I have found that when such an arrangement of indexing elements is utilized certain possible adverse effects of the variation in scanning speed on the accuracy and reliability of the index signals are substantially mitigated, at least over a usefully large range of phases of said variations. Preferably the arrangement of the groups of elements and the index elements is such that the integer M is an odd number and the integer N is an even integer, N preferably being 2. In a particularly useful form of the invention, N is 2 and M is 3.

In certain preferred embodiments of the invention, such as in color television image-display systems, the above-mentioned groups of elements are responsive to the scanning entity, typically a cathode-ray tube beam, to present light of respectively different colors, such as red, green and blue for example, and the time phase of the variations in scanning speed are such as to cause slowest scanning for that position in each of said groups which causes presentation of light of the hue desired to be presented by that group.

In a preferred embodiment of the invention, the phase of the index signals produced by scanning of the index elements is averaged over the time of scanning of a few groups and used to control the frequency and phase of a deflection-speed modulation signal, which may be derived from a color television chrominance signal and used to produce a controlled modulation of the speed of deflection of the scanning cathode-ray beam. With this system, substantial amounts of deflection-speed modulation at the group-scanning frequency may be employed to enhance the saturation of colors intended to be rendered with high saturation, without so disturbing the phase of the index signal as to make it non-representative of beam position or ineffective in producing proper color rendition in the image.

To produce such slowing or dwelling at one particular point in the scanning of each group of elements, the frequency of the variations in scanning speeds is preferably substantially equal to the frequency at which the groups are scanned in the absence of such variations.

In certain preferred embodiments of the invention, the intensity of the scanning entity is also varied in accordance with the image to be formed, and the magnitude and phase of the deflection-speed modulation is so correlated with the intensity variations of the scanning entity as to produce slowest scanning when the beam intensity is highest, thereby enhancing the saturation of colors intended to be highly saturated.

In certain preferred embodiments, means are provided for enhancing the magnitude of the deflection-speed modulation at group scanning frequency, particularly for certain hues or ranges of hues of colors to be presented; and preferably a deflection-speed modulation at the stripe-scanning rate, such as to slow the beam when substantially centered on each stipe, is introduced when the deflection-speed modulation at the group-scanning rate decreases substantially. Also, a corresponding controlled amount of periodic variation of beam intensity is preferably introduced as the deflection-speed modulation at stripe-scanning frequency is introduced, in a phase further to enhance brightness and even to enhance saturation when the deflection-speed modulation at group-scanning rate is not employed or is of small magnitude.

In one preferred embodiment of the invention the extent of the magnitude of deflection-speed modulation at the group scanning rate is enhanced whenever the light intended to be produced by a given group is substantially the same as the primary color which one of the elements of the group produces when activated alone. TO enable this, there is preferably employed a hue detector, whicy may compare the phases of index signals and chrominance-representing signals to produce an output signal representative of the hue of the color to be presented, and preferably to indicate when a primary color is to be presented. This output signal may be used to control the amplitude of the deflection-speed modulation at the group-scanning frequency when primary colors are to be produced, and may be used also to control the introduction of intensity modulation and scanning-speed modulation at the stripe-scanning rate.

In one preferred application of the invention to color television, there are provided means for modulating the transverse deflection speed of a color cathode-ray tube beam in accordance with the saturation and hue intended for the portion of the image being scanned. The chrominance-representing portion of the color signal may also be applied in appropriate form to the beam-intensity controlling element of the chrominance signal applied to the beam-intensity controlling element of the cathode-ray tube may be a sinusoid at the frequency of scan of the color line triplets, and may also be applied to cause a microdeflection of the beam this microdeflection being superposed on the normal horizontal sweep of the beam in phase quadrature with the beam-intensity chrominance control signal, so that when the chrominance signal is instantaneously at its peak so as to produce a maximum instaneous beam intensity within the cathode-ray tube, the rate of superposed microdeflection is greatest and in opposition to the normal transverse deflection, thereby tending to arrest the beam momentarily at the position with respect to the phosphor lines for which accurate rendition of the saturated color will be produced. In this form of the invention, the superposed microdeflection signal can be a sinusoidal waveform, which is very simple to derive from the sinusoidal chrominance signal.

In particularly simple form of the invention, chrominance signals varying at the average rate at which the phosphor line triplets are scanned by the beam in the local region of interest are applied to a small auxiliary micodeflection yoke on the cathode-ray tube neck so that the current in the yoke, being at 90° to the applied voltage, will produce the desired horizontal arresting or dwelling of the beam inphase, time and frequency synchronism with the chrominance signal applied to the beam-intensity control electrode, so as to cause the beam to advance forward most slowly (if at all) in its total forward scan when the chrominance intensity signal is instantaneously greatest. In another particularly simple form, auxiliary electrostatic deflection plates located within or around the neck of the cathode-ray tube are fed with the chrominance signal after it has been shifted by 90° with respect to the chrominance signal applied to the beam-intensity control element of the cathode-ray tube, to accomplish the same above-described superposed microdeflection.

Also, in one preferred form of the invention the color cathode-ray tube used is one in which the image-producing lines are immediately contiguous each other, without substantial spatial guard bands between them, thereby enabling a corresponding increase in brightness of the image, particularly on complement colors and on white.

Where the cathode-ray tube utilizes groups of light-controlling stripes with guard bands between the adjacent stripes, use of the chrominance signal to control the deflection modulation at group scan frequency tends to decrease, rather than increase, the brightness for complement colors (e.g. yellow for a red, green, blue striped tube). This is because the beam will tend to dwell half-way between adjacent color stripes when reproducing a complement, i.e. in a position centered on a guard band. To reduce or eliminate this effect, this invention further proposes means for reducing or eliminating the deflection modulation at group scanning frequency for reproduction of hues at or near complement colors. Preferably this is accomplished by means for producing a control signal indicative of the phase of the input chrominance signal relative to the phases for which it produces primary and/or complementary colors, and means for applying this control signal to reduce the magnitude of the deflection-modulation at the group-scanning rate when the phase of the chrominance signal departs substantially from that representing a primary color. Preferably also means are provided for applying an increasing amount of deflection modulation at the frequency of scanning of individual stripes in the groups (e.g. at three times the group scanning frequency) when the deflection-modulation at the group-scanning rate decreases substantially, thereby to enhance the brightness of colors which are when not intended to be at or near saturated primary colors.

When the cathode-ray tube is of a type utilizing contiguous color elements in each group, without guard bands, similar provisions are preferably made for decreasing the group-frequency deflection modulation when the desired hue to be displayed departs substantially from that of a primary; and preferably also for increasing the stripe-frequency delfection modulation when the color to be displayed is not a fairly saturated primary hue. This minimizes errors in displayed hue which may otherwise tend to arise when an intermediate color (i.e. one produced by unequal activation of two adjacent color stripes) is to be produced, particularly in a system in which the horizontal width of the beam spot is not uniform over the whole area of the screen.

In systems of the foregoing type in which the phase of the chrominance input signal is sensed and used to cause the amplitude of group-frequency deflection-speed modulation to be maximum for primaries, according to a further alternative feature of the invention, phase-quantizing means are used to cause the slowest beam scanning to occur at the center of a stripe over a predetermined range of chrominance signal phases on both sides of the phase representing a pure primary. The advantages of so doing are that brightness is increased and saturation as well as color accuracy increased when primary colors or colors close to primaries are to be produced. It will be understood that "primary" or "primary color" as used herein designates a color produced when only one of the types of light-controlling element in a group is actuated.

Preferably also, when an auxiliary beam deflection yoke is utilized to cause the above-described deflection-speed modulation, means are preferably provided for mitigating undesired interactions between the auxiliary yoke and nearby sources of interference, such as the main horizontal and vertical deflection yoke of the cathode-ray tube. In one embodiment, such interaction is minimized by positioning the microdeflection yoke partially within the main deflection yoke, at a position for which the effects on the microdeflection yoke of the external magnetic field of the main deflection yoke are substantially cancelled by the effects of the magnetic field produced by the main deflection yoke at its interior. In another embodiment, the inductance of the microdeflection yoke is resonated with associated capacitive elements at the frequency or frequencies to be supplied thereto, thus to minimize undesired interactions with the main deflection yoke of the magnetic field. Where the microdeflection yoke is driven by an amplifying device such as a semiconductor amplifier, the resonating circuits preferably include D. C. -blocking capacitive means for preventing the application of changing D. C. or video frequency components or currents (such as can appear in the output of the microdeflection driver amplifier if it has, for example, a single-ended class B output stage) to the microdeflection yoke, where such signals otherwise might operate to cause rapid changes of beam horizontal displacement not necessarily properly related to improving color rendition, and not necessarily fully corrected for by the index circuits, due to the time required for the index circuits to respond.

With the arrangement according to the invention in which the amplitude of the deflection modulation is approximately directly proportional to the color saturation to be displayed, the microdeflection action does not occur when it is not needed, e.g., when producing gray or white, and comes into strongest usage only when it is most important, e.g., when reproducing saturated colors. In this way it does not cause the loss of light output of prior systems of microdeflection at the stripe-scanning frequency in which the beam dwelt for an equal time interval on all color stripes, including stripes for which the electron beam may have been of zero or small intensity.

In one preferred form, the signal used for microdeflection is limited in its maximum amplitude prior to being applied to the microdeflection means. The main purpose served by this limiting is to prevent excessive microdeflection, which might result for signals intended to produce high color saturation when the manual chroma controls are set too high by the operator of the television receiver; such excessive values of microdeflection may cause the index signal, for some saturated colors, either to vanish or to become sufficiently incorrect in phase as to no longer usefully represent beam position. A second purpose for which such limiting action can be used is to control the saturation of colors so as to make them either more faithful or more pleasing to the eye of the viewer.

As pointed out above, the method of deriving the necessary microdeflection signal and of accomplishing the mirco-deflection may be extremely simple and inexpensive.

The option of using the system of the invention to permit the use of wider spot sizes is an important one, since one of the difficulties and sources of expenses in providing index-type cathode-ray tube color image display devices of known types has been in the providing of a sufficiently fine, accurately focussed spot over the entire area in which the image is to be reproduced.

BRIEF DESCRIPTION OF THE FIGURES

These and other objects and features of the invention will be more readily understood from a consideration of the following detailed description, taken in conjunction with the accompanying drawings in which.

DESCRIPTION OF SPECIFIC EMBODIMENTS

Figure 1:
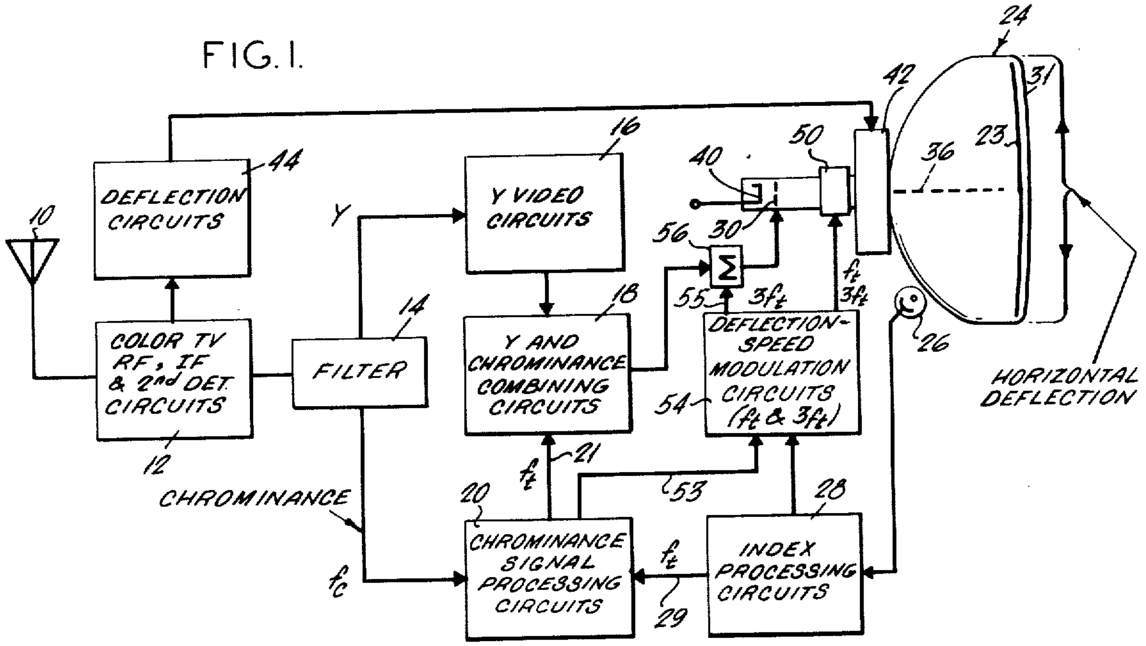
FIG. 1 is a schematic diagram, largely in block form, representing a color television receiver incorporating one form of the present invention.

Referring now to the specific embodiments of the invention shown by way of example only, FIG. 1 represents one form of color television image-display system to which the invention is applicable. An antenna 10 receives the usual color television radio-frequency transmissions and applies them to the color television RF, IF and second detector circuits 12. The video frequency signals from the second detector of circuits 12 are passed through a filter 14 which separates the Y or luminance signal from the chrominance signal, the Y signal being passed through the Y video circuits 16 to the Y and chrominance combining circuits 18. The separated chrominance signal at subcarrier frequency $f_c$, including the usual color reference burst, is applied to the chrominance signal processing circuits 20 wherein it is converted on line 21 into the desired form, which may consist of a modulated carrier at frequency $f_t$, where $f_t$ is in the frequency at which triplets of image-forming phosphor lines of the image-forming screen 23 are scanned by the beam in the color picture tube 24. The chrominance signal on line 21 has an amplitude which increases with color saturation, (and which may be zero amplitude for gray or white) and a phase which corresponds to the hue to be displayed. This chrominance signal at frequency $f_t$ is supplied over line 21 to the Y and chrominance combining currents 18 and combined therein with the Y signal to produce the desired combined signal for controlling formation of the color image on tube 24.

Figure 2:
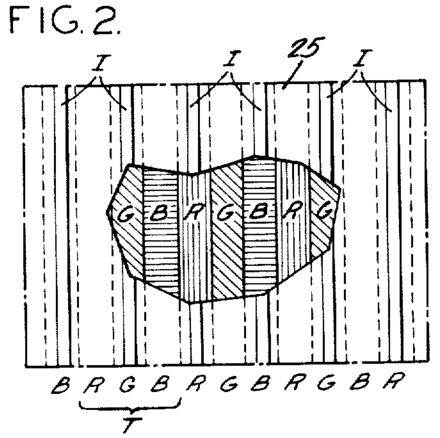
FIG. 2 is a fragmentary view, with parts broken away, of the interior side of the front of the color cathode-ray tube of FIG. 1 including an image forming screen with contiguous light-producing stripes.

More particularly, referring to FIGS. 1 and 2, the cathode-ray tube 24 is of the type utilizing groups (in this case triplets such as T in FIG. 2) of vertical phosphor stripes across which the cathode-ray beam is scanned. As will be described presently in more detail, (and as is set forth in my previously issued U.S. Pat. Nos. 2,892,123 issued June 23, 1959, 3,013,113 issued Dec. 12, 1961 and 3,305,788 issued Feb. 21, 1967; and in my co-pending U.S. applications Ser. No. 105,047, filed Jan. 8, 1971; 132,692, filed Apr. 9, 1971; 214,888, filed Jan 3, 1972; 161,835, filed July 12, 1971; and 187,741, filed Oct. 8, 1971) the index elements such as I (see FIG. 2) which are responsive to impingement by the beam to produce rearwardly-directed light are positioned on the inner side of the screen 23 of the cathode-ray tube 24, i.e. on the side toward the cathode of the thin aluminum layer 25 covering the inner or rear surface of the color phosphor lines. The index elements or stripes I are viewed by a photo-responsive device 26 to produce electrical index signals at frequency $f_I$ which are process in the index processing circuits 28 to produce an output line 29 thereof an output signal which may be at the frequency $f_t$ of the scanning of the triplets of the phosphor stripes in the tube 24. The index signal on line 29 is supplied to the chrominance signal processing circuits 20 wherein it is used, in effect, to convert the received chrominance signal of subcarrier frequency $f_c$ to a chrominance signal on line 21 at carrier frequency $f_t$ and having sidebands about the carrier $f_t$ due to the chrominance information. The latter chrominance signal on line 21, at subcarrier frequency $f_t$, is applied to the Y and chrominance combining circuits 18, and supplied therefrom along with the Y signal to the intensity-controlling element, in this case the intensity control electrode or grid 30 of the cathode-ray tube 24.

FIG. 2 shows a portion of the image-forming screen in the color cathode-ray tube 24 in this example. On the interior side of the glass front face plate 31 of the tube 24 are located triplet groups such as T in the figure, each containing phosphor stripes producing light of different colors in response to beam impingement, in this example each group of triplets comprising a red-light producing phosphor stripe R, a green-light producing phosphor stripe G and a blue-light producing phosphor stripe B, here each shown as being immediately adjacent or contiguous to its counterparts in the triplet group. These will be referred to hereinafter as the red, green and blue stripes or lines. These triplets are preferably positioned immediately adjacent each other transversely of the cathode-ray tube face plate, and are scanned by the horizontally deflected cathode-ray beam 36, the frequency of scanning of successive triplets being $f_t$. The vertical index stripes labeled I in FIG. 2 are positioned at predetermined locations across the width of the cathode-ray tube screen and are preferably substantially uniformly spaced in such positions that they are scanned by the cathode-ray beam at a rate $f_I$ which is an odd multiple of one-half the rate $f_t$ at which the triplets are scanned, in this example the index-stripe scanning frequency $f_I$ being one and one-half times the triplet scan rate $f_t$. The lateral placement of the index stripes within the triplets may be chosen as shown in FIG. 2; or the index stripes may be positioned otherwise more advantageously, such as shown and discussed below in connection with FIGS. 2A, 13 and 14.

While FIG. 2, for simplicity, shows a cathode-ray tube screen having narrow index stripes along the centers of alternate color phosphor lines, I prefer to use one of the screen constructions to be described with reference to FIGS. 2A, 13 and 14 hereof. In the construction shown in FIG. 2 the index stripes are preferably made as pervious to the beam as possible while still providing adequate indexing. However, absorption of the beam by the index stripes will tend to produce some visually noticeable intensity modulation of solid color fields at one-half the triplet frequency. This effect may be mitigated in the construction of FIG. 2 by employing therein, in addition to the index phosphors I, another set of non-light producing "phosphors" or powders, which are interspersed as dummy "index" stripes midway between the true index stripes, or everywhere that the index phosphors I are not present. The amount of electron absorption by this interspersed powder is chosen to be the same as that of the index phosphor I, and therefore the number of electrons arriving at the viewing phosphors R, G, B of FIG. 2 will be independent of whether the beam has passed through the index phosphors I or not.

Figure 2A:
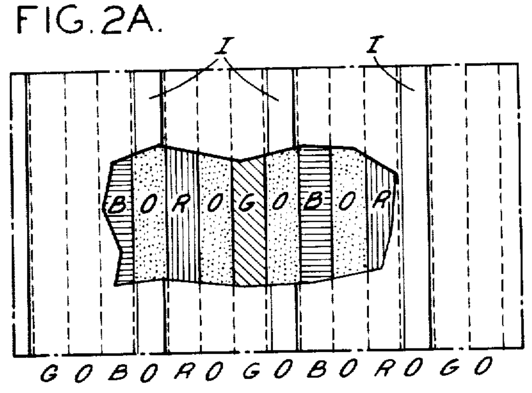
FIG. 2A is a similar view showing an alternative form of image-forming screen using guard bands.

In FIG. 2 the screen shown employs contiguous phosphor stripes; however, the screen may also be of the known type shown in FIG. 2A which differs from the screen of FIG. 2 in that each phosphor line is spaced from its neighbors by a guard-band stripe such as O which does not respond to impingement by the beam to produce light toward the viewing area and which is also preferably light absorbing, hence generally appearing as a black stripe; and in that the index lines I are located on every other guard-band stripe O.

While the bands O have the undesirable effect of somewhat reducing the light output in proportion to their width, they have the advantage of allowing use of a somewhat larger beam spot, without reduction of color saturation. For example, in the case of guard bands having the same widths as the index stripes (50 percent guard bands), the viewing phosphors are reduced in width by 50 percent as compared to FIG. 2, but in FIG. 2A the beam spot size can be increased to a value approaching one-half a triplet width without causing desaturation, whereas without any guard bands, the largest spot size permissible without causing desaturation is one-third of the triplet width.

Referring again to FIG. 1, the color cathode-ray tube 24 is provided with a high resolution electron gun assembly which includes the usual electron-emissive cathode 40, and with a deflection yoke 42 for accomplishing the conventional horizontal and vertical deflections required to scan a television raster on the cathode-ray tube screen. To provide this deflection, there are provided conventional deflection circuits 44 controlled from an output from the color TV, RF, IF and second detector circuits 12 in known manner.

The portion of the system of FIG. 1 thus far described is of previously known form and, without more, is subject to the following limitations. When the chrominance signal fed to the cathode-ray tube is of sinusoidal form, and particularly when the spot size of the cathode-ray tube beam is for example at least comparable in width to the width of the color stripes, the beam actually produces light emission not only at the center of the beam and not only at the instant of the peak of beam current, but also at parts of the beam on each side of the center and at times adjacent the time of the peak of beam current. When a saturated primary color is to be reproduced, such as red, green, or blue, this finite width of the beam and this finite time of beam current turn-on and turn-off can cause color desaturation, because a portion of the electrons impinge not only the desired stripe, but also adjacent stripes. This desaturation can be reduced in accordance with the prior systems only at the expense of light output or with other attendant disadvantages.

In accordance with the invention, there are provided means for causing the deflection speed of the cathode-ray tube beam as it scans the groups of color triplets to be modulated in a manner that is dependent upon the desired color to be displayed. In general, the modulation of the scanning speed is made such that the beam spends a relatively longer time on those phosphors which the particular color to be produced in that local region requires be activated in relatively brighter proportions than on those phosphors in that local region which is not required to be activated in appreciable quantities to produce that color.

This is accomplished in FIG. 1 by providing auxiliary beam-deflection means 50, such as a small horizontal deflection yoke or pair of electrostatic deflection plates, for appying small additional deflecting fields to the cathode-ray tube beam over and beyond the usual deflection fields produced by the conventional deflection yoke 42. Since the frequency of deflection which is to be imparted to the beam by this deflection means 50 is one to two orders of magnitude greater than the normal horizontal scan frequencies in yoke 42, any conductive coatings, such as graphite, normally used inside the neck of the cathode ray tube 42 should be a sufficiently high resistance that negligible or little power becomes dissipated in this coating inside the neck in the region of deflection means 50. In the system of FIG. 1, the deflection-speed modulation field so produced by deflection means 50 is most conveniently, but not necessarily, of sinusoidal form and may have a frequency equal to $f_t$ and a phase and amplitude controlled by the chrominance signal, this frequency $f_t$ being the frequency at which the groups of color triplets are scanned by the beam when the beam is being scanned solely by the conventional deflection yoke 42. The deflection-speed modulation field is in the case of FIG. 1 produced by the chrominance signal from the chrominance signal processing circuits 20 after it has been modified by passing over line 53 and through the deflection speed modulation circuits 54 to the deflection modulation means 50.

The auxiliary beam-deflection means 50 and the modified chrominance signal supplied thereto cause the cathode-ray beam to dwell longer at a particular position within each triplet than it otherwise would have, the position and degree of this dwelling depending upon the phase and amplitude, respectively, of the chrominance signal. The effect of this arrangement, as will presently be described in detail, is to increase light of the desired hue by causing the cathode-ray tube beam to scan relatively slower, i.e. to dwell relatively longer, in or near that position within each triplet which, when impinged by the beam, will cause emission of light most closely representative of the desired hue in that portion of the image, as determined by the transmitter instructions for that portion of the image; and by causing the beam to scan relatively more rapidly over other positions in the triplet. Preferably also the beam is caused to dwell relatively longer in such positions, or to scan relatively slower past such positions, the greater is the desired degree of saturation of the color to be there reproduced, all as determined by the chrominance signal as received from the transmitter and recreated on line 53. As will be described more fully hereinafter, in certain preferred embodiments deflection-speed modulation at the rate of scanning of the individual stripes ($3f_t$) is also introduced, to a controlled extend and under certain conditions, to slow the beam on each color stripe; at such times a periodic increase in beam intensity may also be provided when scanning the centers of each stripe, by application of a signal at $3f_t$ from circuits 54 over line 55 to adder 56 and thence to the grid 30 of tube 24.

Figure 3:
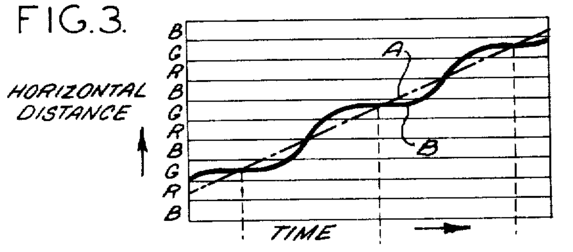
FIGS. 3 through 10 are illustrative graphical representations to which reference will be made in explaining the operation of the invention in the form using sinusoidal microdeflection signal drive waveforms.
Figure 4:
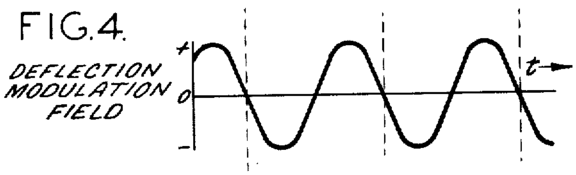
Figure 5:
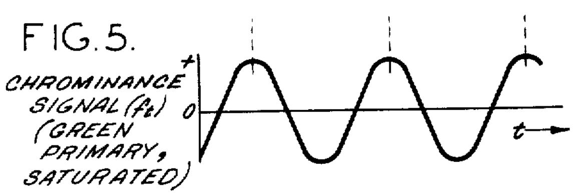

Referring to FIGS. 3, 4 and 5 in which time is plotted as abscissa to the same scale in the three figures, and in which the waveshapes shown are illustrative only, the ordinates in FIG. 3 represent horizontal distance across the vertically-striped screen of tube 24, the various color lines being represented by R, G and B and arranged contiguously as in FIG. 2. The broken straight line A represents the linear deflection with time which the center of the beam performs in a conventional system without deflection-speed modulation, while the solid line B illustrates one type of speed-modulated deflection produced in accordance with the invention in one form when a saturated color (in this case green) is to be produced. In this example, the beam dwells at the center of each green line for a much longer time than with conventional deflection and then moves more rapidly than usual to the center of the next green line; accordingly it produces a brighter green than would the conventional linear deflection also, because the beam spends less time on red and blue than it would without the deflection-speed modulation, and because when the beam is actually on red and blue it is relatively more turned off than when on red and blue without deflection-speed modulation, the amount of red and blue produced is considerably reduced by the deflection speed modulation. Therefore the green is not only brighter, but much more saturated than without deflection-speed modulation.

Ordinates in FIG. 4 represent a form of deflection-speed modulation field which when added to the conventional linear deflection produces the general type of deflection shown in curve B of FIG. 3. The deflection modulation field in this example is sinusoidal and centered about zero, the zero points at which the sinusoid passes through zero from plus to minus occurring when the beam without deflection modulation would be centered on the green stripe, it being understood that the positive deflection modulation fields, acting by themselves, are those which tend to deflect the beam forwardly while negative deflection modulation fileds are those which tend to deflect the beam backwardly with respect to the normal direction of horizontal scanning. Since a sinusoid changes most rapidly toward the negative direction at its plus-to-minus zero crossing points, the greatest tendencies to arrest the normal forward scan occur at these times, so as to produce the desired dwelling on green as shown in FIG. 3.

FIG. 5 shows a typical chrominance signal voltage at frequency $f_t$ having a phase almost 90° different from that of the sinusoid of FIG. 4 which, when applied across an auxiliary beam-deflection means 50 having the form of a yoke of one or coils, will produce a current variation therein having a waveform like that in FIG. 4 due to the nearly 90° relation between voltage across, and current in, a coil, whereby the deflection means 50 is caused to produce the deflection-speed modulation field of FIG. 4.

Figure 6:
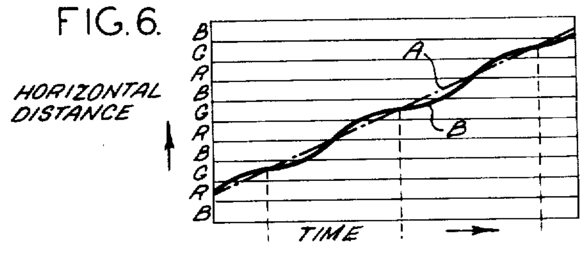
Figure 7:
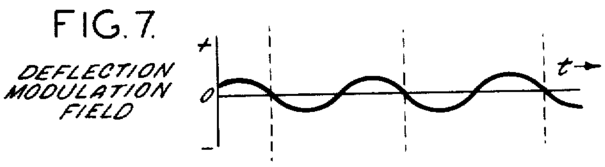
Figure 8:
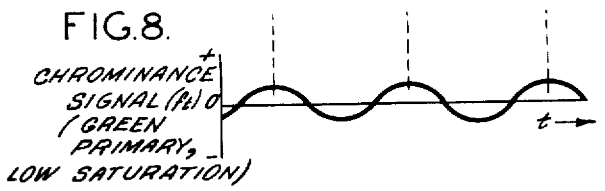

FIGS. 6, 7 and 8 are graphs having the same ordinates, abscissae and scale factors as FIGS. 3-5 respectively, but illustrate the case in which a much less saturated primary green is intended to be produced. In this case the chrominance signal shown in FIG. 8 will have the same phase and frequency as that shown in FIG. 5 but a much smaller amplitude because of the lower color saturation to be produced. The deflection-speed modulation field which it produces is therefore also smaller in amplitude of variation as shown in FIG. 7, and the perturbation or modification of the normal linear deflection correspondingly smaller as shown in curve B of FIG. 6; the additional dwell time on green due to the deflection-speed modulation is therefore also correspondingly less, as is desired to produce the less saturated green.

Figures 9, 10:
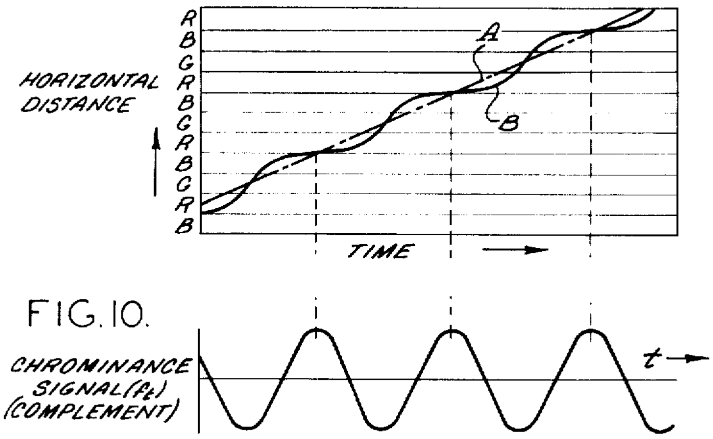

FIGS. 9 and 10 again have the same ordinates and abscissae and the same scale factors as FIGS. 3 and 5 respectively. However, in this case a saturated complement such as magenta (a mixture of red and blue) is to be produced rather than a primary color such as red, green or blue. In this case the chrominance signal of FIG. 10 has positive peaks occurring when the beam is traversing the boundary between each red line and each adjacent blue line. The deflection-speed modulation then causes the beam to dwell at red-blue boundaries to enhacne the brightness of the complement color magneta, as desired; and, since the beam spends less time on green, and is in a more weakened state when on green, the amount of green produced is substantially reduced by the deflection-speed modulation; this can greatly enhance the saturation of the magenta.

Figure 11:
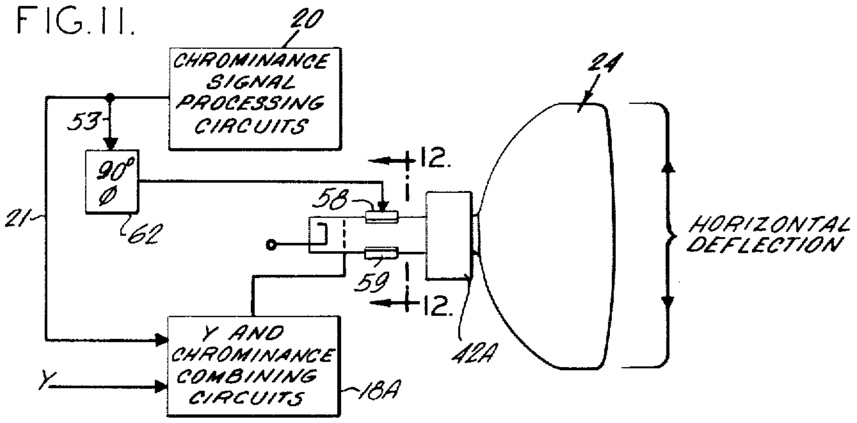
FIG. 11 is a schematic diagram showing an alternative form of apparatus embodying the invention.
Figure 12:
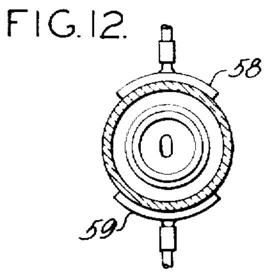
FIG. 12 is a view of a part of FIG. 11 taken along the lines 12—12 of FIG. 11.

FIGS. 11 and 12 illustrate certain alternate embodiments of the invention, in which parts corresponding to those of FIG. 1 are designated by corresponding numerals. The system in this case uses a pair of electrostaic microdeflection plates 58, 59 which may be located opposite each other inside the barrel or neck of the tube 24, but for implicity of construction and greatest economy are preferably placed on or near the outside surface of the neck as shown. The chrominance signal processing circuits 20 provide a chrominance signal voltage which is shifted approximately by 90° in the 90° phase shifter 62 and applied between the plates 58, 59 to produce the desired microdeflection. Deflection-speed modulation circuits 54 may be again employed as in FIG. 1 to provide amplifying, limiting, phase adjustment and other functions as desired, and the 90° phase shifter 62 may be incorporated in such circuits 54.

Figure 13:
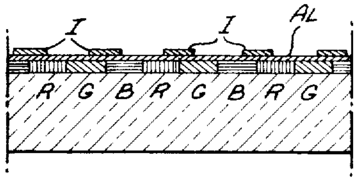
FIGS. 13 and 14 are fragmentary horizontal sectional views illustrating certain preferred alternative forms of color television screen arrangements for use in the system of the invention.

The construction shown in FIG. 13 differs from that of FIG. 2 in that the centers of the index lines I coincide with the boundaries between adjacent color phosphor stripes. This has the advantage that, on a solid color raster, there is much less beat at one-half the triplet frequency visible to the eye, and there is therefore less need for the equalizing absorbing layer described in connection with FIG. 2.

Figure 14:
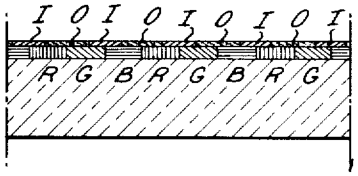

The arrangement shown in FIG. 14 also differs from FIG. 2 in that it uses index lines centered along phosphor stripe boundaries, but also uses beam-opaque bands O filling the spaces between index lines. These opaque layers O serve a purpose similar to the opaque layers of FIG. 2A insofar as electron beam absorption is conceived, but not as effectively, since they do not protect each adjacent stripe, only alternate stripe boundaries.

I have found an additional benefit from having the centers of the index stripes located midway between the centers of the effective light producing poritons of the viewing stripes (as in FIGS. 2A and 13) rather than, say, being located at the centers of the viewing stripes (as in FIG. 2). This additional benefit relates to reducing even further small errors in index phase in my invention, as is described later.

Considering now the effects of the deflection-speed modulation upon deriving index signals indicative of beam position, it can be seen from FIG. 3, for example, that if one color of phosphor stripe, such as the blue stripe, is utilized to generate the indexing signal as proposed for example in the above-cited Sylvania-Thorn British patent, the phase of the indexing signal relative to the scanning position of the beam within each group of phosphor stripes will in general shift very substantially with hue-representing shifts in the phase of the chrominance signal used to produce the deflection-speed modulation. Thus FIG. 3 shows that when primary green is being produced, the phase of actuation of the blue stripe is much later, and also much briefer, than for a linear trace, and that this is ture for each of the blue stripes. The effect of this will be that when the index signal is used thereafter to intensify the beam when the index signal has a value indicative of the beam being on blue, when in fact it is not actually on blue, there is created a substantial systematic phase shift of the chominance signal which controls the beam intensity, and a resultant substantial error in image hue will result. The extent and nature of this error will vary with chrominance-signal phase and amplitude, but it can be so great as to not only cause incorrect colors but also even loop oscillations of displayed hue even when the transmitter signal calls for constant hue.

Figures 15, 16:
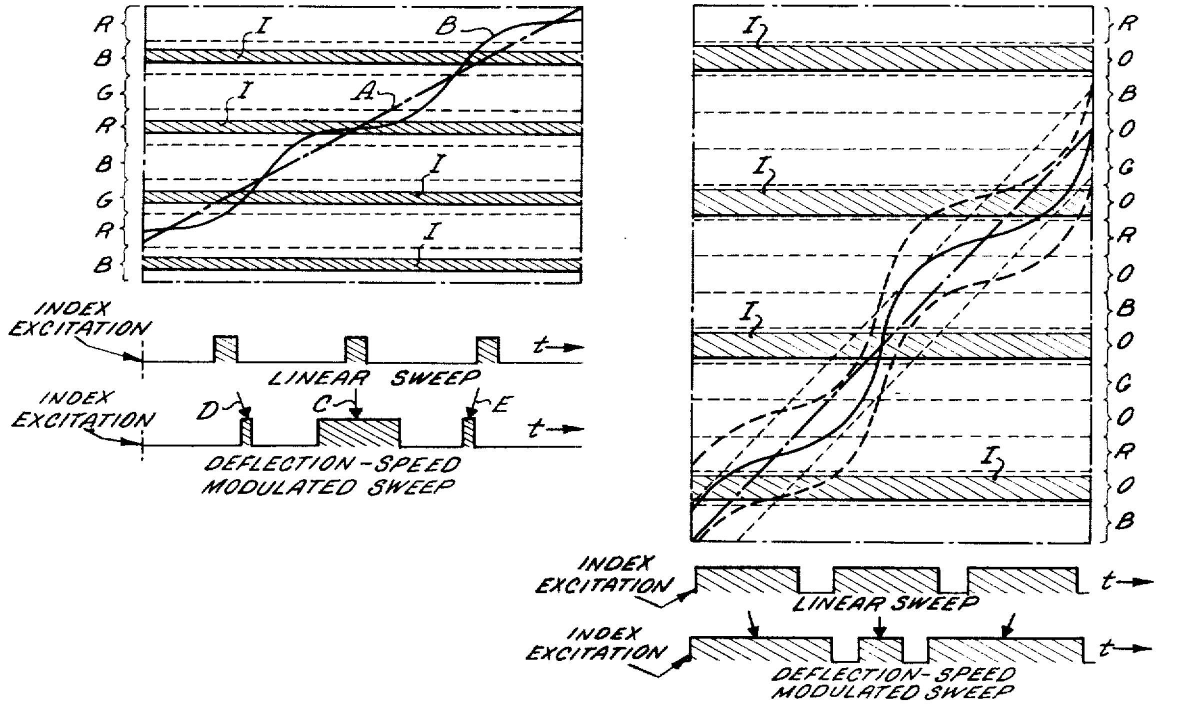
FIGS. 15 and 16 are diagrams to which reference will be made in explaining the effects of deflection-speed modulation upon one preferred pattern of index elements, for the case of a contiguous stripe tube and a guard-band tube, respectively.

FIG. 15 illustrates how such undesirable effects of deflection-speed modulation on index signal are mitigated when using an index stripe pattern according to the present invention. It will be understood first that the deflection speed modulation has no effect upon the starting index signals produced prior to each horizontal sweep, since no chrominance signal is present during the scanning of the starting stripes in the preferred forms of the invention, as described for example in my above-cited patents and copending applications, and accordingly the horizontal sweep is substantially linear during the scanning of the starting stripes.

FIG. 15 represents diagrammatically a screen structure like that of FIG. 2 using contiguous red, green and blue phosphor stripes R, G, B, with an index stripe I centered on alternate phosphor stripes, producing three index stripes for each two color triplets. Also represented is a linear sweep A corresponding to a linear horizontal deflection of the beam as a function of time, and a deflection-speed modulated sweep B for the case in which a red primary color is being produced. Beneath the diagram, and in time-phase alignment therewith, are shown first the times of index excitation which would be produced by the linear sweep, and below that the times of index excitation which are produced by the deflection-speed modulated sweep. As shown, the linear sweep produces equally time-spaced intervals of index-stripe excitation. When the deflection-speed modulated sweep is employed, the time-phase of excitation of the index stripe on the center of the red phosphor stripe is centered with respect to the time of index excitation of the same index stripe when a linear sweep is employed, as indicated by the arrow C. The center of the time of excitation of the immediately-preceeding index line (on the green stripe) when deflection-speed modulation is used is retarded somewhat in phase with respect to the time of its excitation with a linear sweep, as indicated by the arrow D; however, the phase of index excitation of the following index line (on the blue stripe) is retarded by an equal amount, as indicated by the arrow E. This symmetrical shifting of the time of occurrence of the index excitation pulses produces and index signal which, when phase-averaged as by passing through band pass filtering circuits of the index processing circuits 28, exhibits substantially the same phase as for the linear trace. Accordingly, the hue of the image is not adversely influenced by the effects of the deflection-speed modulation on index signal. The same general situation exists when either of the other two primary colors or any one of the three complementary colors is to be presented, the deflection-speed modulation producing a substantially symmetrical change in the times of excitation of the index elements such that the average phase of the index signal remains substantially unchanged. This desirable result obtains because of the use of an index stripe pattern such that the frequency of scanning of index stripes as M/N times the frequency of scanning of the color triplets when a linear sweep is used, where N and M are integers and M is greater than N and other than an integral multiple of N. In general, the time of scanning required to produce a complete symmetrically shifted set of index pulses is the time required to scan N triplets, or M index stripes, and the averaging of the index signal should be over at least this length of time.

I have found that when colors other than primaries and complements are to be presented, either intensity modulation of the beam or substantial deflection-speed modulation of the beam can produce some residual phase error in the phase-averaged index signal and some discrepancy in hue of the reproduced image. While in general these residual errors are fully acceptable for most purposes, as will be describe hereinafter in certain embodiments of the invention the deflection-speed modulated sweep at the frequency of scan of color triplets is deenergized except when primary colors, or colors near primaries, are being produced, and in this event the deflection-speed modulation has negligible undesired effect on index phase, provided the index stripes are located with their centers centered either midway between the centers of phosphor stripes or upon the centers of the phosphor stripes.

FIG. 16 is a diagram generally similar to FIG. 15, with the principal exception that the screen is assumed to be of the type shown in FIG. 2A, utilizing the beam-opaque guard bands 0 between each neighboring color phosphor stripe and in that, in addition to the path of the center of the beam, there are also shown the approximate instantaneous positions of the edges of the beam, assuming the beam to have a constant width in the horizontal scanning direction of somewhat over two stripe widths. The case shown is again that for the display of a red primary color, and again a symmetrical phase-shift of the times of index excitation is produced by deflection-speed modulation within the time of scanning of two triplets. Accordingly, when the index signal produced with deflection-speed modulation is passed through the above-described phase-averaging circuits, the resultant index signal is again substantially unaffected by the deflection-speed modulation when primary colors or complements are being produced, although again for colors departing substantially from primaries a variable, but generally small, amount of departure of the phase of the index signal from its intended value may occur.

In FIG. 15 and 16 the blocks representing the times of index excitation are not intended to show the amount of excitation at each instant of time during the scanning of each stripe. In actuality the instantaneous magnitude of index excitation is a relatively complex function, particularly in view of the non-uniform beam density over the area of the beam spot, and in view of changes in the size of the spot for different beam intensities and positions on the screen. However, accurate calculations and measurements have shown that the conclusions reached from the simplified analysis discussed in connection with FIGS. 15 and 16 are valid and that, over wide ranges of operating conditions, the index signal produced has its useful component at the frequency M/N times the triplet-scanning frequency and an average phase which for practical purposes is sufficiently unaffected by the deflection-speed modulation of the beam described herein, under the operating conditions set forth.

I have found that, at least in certain forms of the invention, there are limits to the maximum magnitude of deflection-speed modulation that can be advantageously used. Excessive modulation of scan speed may cause greater-than-desired errors in average index phase information, particularly for colors which are centered neither on an index stripe nor midway between the centers of index stripes. The amount of deflection-speed modulation which is not excessive from this standpoint is dependent upon grid drive waveform duty cycle, but as a general rule, I have found that when the grid modulation at triplet frequency is used to cause conduction of the CRT beam for 180° or more of the chrominance signal cycles, deflection-speed modulation at triplet scan frequency having peak-to-peak excursions of one-third of a triplet causes stable indexing, and produces large increases of primary light output which can be as high as two-to-one, for a given level of primary saturation; or for a given primary light output can usually raise color saturation from 80 to over 95 percent for example. Deflection-speed modulations in excess of these values can also be used with stability, and advantageously, particularly in the manner which will be presently described and particularly with circuit features and systems operation to be described.

I have also found that when the centers of the index stripes are located midway between the centers of the primary stripes, such as in FIGS. 2A and 13, then for reproduction of primary colors, (which colors are the ones for which deflection-speed modulation is most needed to obtain freedom of admixture of unwanted colors) any error in index phase which is created by transmitter instructions or otherwise tends to be degeneratively phased in the closed loop through the chrominance circuits; and hence, for hues at or near primaries, with the index stripe centers located as described, quite large values of deflection-speed modulation can be used to reduce forward scanning speed at those times when the beam is centered on a primary.

Such degenerative phasing using the index stripe center location above described makes the loop phasing degenerative not only for primary colors when using deflection-speed modulation at triplet scanning frequency, but also degenerative when using deflection-speed modulation at three times triplet frequency, with minimum forward scanning speeds on each stripe center, such as is described later in detail in connection with FIG. 17, to obtain other desirable benefits.

Thus with the locations of index stripe centers being approximately midway between centers of adjacent primary stripes, I have found it possible to use deflection-speed modulation which has amplitudes well in excess of the above referenced one-third of a triplet (for modulation at triplet scanning frequency) up to values as great as approximately $2/\pi$ times the triplet pitch, which is the value at which total forward deflection speed is momentarily reduced to zero at one point in the triplet scan.

However, there will always be some amplitude of deflection-speed modulation (for example, when retrograde deflection becomes excessive, or for example for short duty cycle grid drive waveforms at more modest amplitudes of deflection-speed modulation) in excess of which further increases of amplitude of deflection-speed modulation will no longer improve the picture, or will actually start to make it worse.

To prevent this from happening, the deflection-speed modulation circuits 54 of FIG. 1 preferably include appropriate limiters for limiting to a satisfactory maximum preset or predetermined value the maximum amount of deflection-speed modulation signal applied to the auxiliary deflection means for any chrominance and saturation of color to be produced.

Another factor in the practice of the invention is that when deflection-speed modulation at the triplet scanning rate is used with a guard-band tube such as is shown in FIG. 2A, then during rendition of complement colors, the beam will slow its scanning and dwell at the centers of the guard bands, which tends to reduce the brightness of complements compared to that of other colors. Also as mentioned previously herein, even in the contiguous-stripe tube if any differences in beam-spot size occur over the face of the tube, the rendition of the hues of colors intermediate primaries and complements will exhibit some variation over the tube face, if the system is as described above using only deflection-speed modulation at triplet scan frequency.

Accordingly, for this and other reasons, I prefer to vary the amplitude of deflection-speed modulation at triplet scanning frequency, as a function of hue and saturation of the color to be produced so as to be maximum for rendition of saturated primary colors and be less (including zero) for hues departing substantially from primaries, or for color saturation of less than maximum saturation on primaries. FIG. 17 illustrates a system in which such variation of the amplitude of deflection-speed modulation is provided, and in which deflection-modulation at the stripe-scanning rate 3 $f_t$, and variation of the beam intensity at 3 $f_t$, are automatically introduced when the deflection-speed modulation at triplet scanning rate $f_t$ is automatically reduced.

Figure 17:
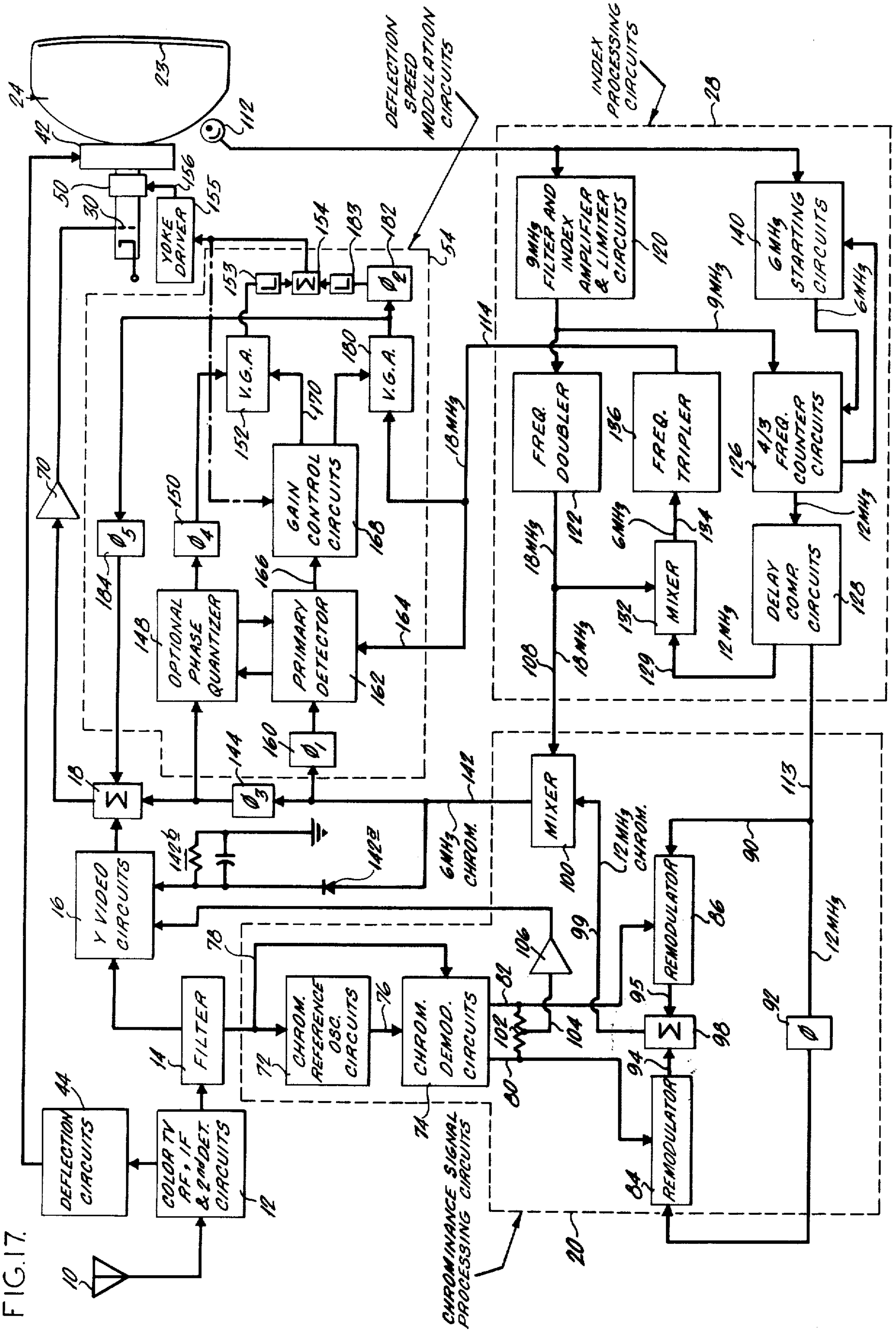
FIG. 17 is a block diagram more detailed than FIG. 1, showing a system embodying the invention in one of its forms.

Referring now to FIG. 17, in which parts corresponding to those of FIG. 1 are indicated by corresponding numerals, the conventional antenna 10 and the color TV RF, IF and second detector circuits 12 again supply suitable signals to deflection circuits 44, which in turn provide the conventional type of horizontal and vertical deflection by means of the deflection yoke 42. The output of circuit 12 is passed through Y and chrominance separating filter 14, the Y signal being supplied to the Y video circuits 16 and thence, by way of the adding or combining circuit 18 and a suitable amplifier 70, to the intensity-controlling element or grid 30 of the color picture tube 24. The separated chrominance signal is supplied to the chrominance signal processing circuits 20. In the latter circuits, the chrominance signal is supplied to the chrominance reference oscillator circuits 72 for separation of the usual color burst and generation of the chrominance reference oscillations in phase with the oscillations of the color bursts, as is conventional. The latter chrominance reference oscillations are applied to the chrominance demodulator circuits 74 over connection 76, and the chrominance signal from filter 14 is also supplied to the signal input of the demodulator circuits 74 over lead 78. The chrominance demodulator circuits, which may be conventional balanced demodulators, operate conventionally to demodulate the chrominance signal at two different phase angles of the chrominance subcarrier. The two resultant demodulated chrominance signals appear at output leads 80 and 82, and are then remodulated upon a carrier of another frequency by means of the two remodulators 84 and 86. Thus a carrier of another frequency, such as 12MHz for example, and derived from the index signals as described hereinafter is supplied directly to remodulator 86 over lead 90, and to the other remodulator 84 by way of the phase shifter 92. This causes the two demodulated chrominance signals on leads 80 and 82 to appear at remodulator output leads 94 and 95 respectively, modulated upon two different phases of the 12 MHz subcarrier. The remodulated chrominance signals on leads 94 and 95 are then combined in adder 98 so as to produce a 12 MHz chrominance signal on lead 99, which supplies one input to heterodyne mixer 100.

A combining impedance 102 may be connected between leads 80 and 82 to produce on lead 104 a signal proportional to the weighted sum of the signals on leads 80 and 82, the weighted sum signal being supplied through an appropriate amplifier 106 to the Y video circuits to accomplish conventional correction of the monochrome luminance signal in accordance with converting, say, the NTSC standard signals received by the TV receiver into proper brightness signals to supply to tube 24.

The other input to mixer 100 is supplied thereto over lead 108 from the index signal processing circuits 28. The general principles and operation of such indexing processing circuits are described in my above-identified copending applications and issued patents. In this example, the photosensitive device 112 is positioned so as to view the interior side of the screen 23 of color-image reproducing tube 24 and to produce index signals in response to changes of light emitted by the photoresponsive indexing stripes on the rear of screen 23, as these elements or stripes are impinged by the scanning beam. The index pulses from photosensitive device 112 are applied to the index processing circuits 28, which may be generally of the form previously known from my above-cited patents and patent applications. In the present example, among the functions of the index processing circuits 28 are to produce on output lead 108 thereof a signal at three times the triplet frequency $f_t$ (e.g. at 18 MHz), to provide an output lead 113 thereof delay-compensated signal at twice the triplet rate $f_t$ (e.g. at 12 MHz), and to provide on output lead 114 a signal at three times the triplet frequency $f_t$ (e.g. at 18 MHz), all for reasons to be described hereinafter, and all phased so that the 6 MHz beat between the 12 MHz and the 18 MHz signals supplied as above is unambiguously related to the phase of the beam as it scans, say, the green stripes in each triplet group. Thus the index pulses from photosensitive device 112 are applied to the 9 MHz filter and index amplifier and limiter circuits 120 which select the nominal 9 MHz component of the index pulses and produce a corresponding 9 MHz sinusoidal indexing signal therefrom, at the same time accomplishing the above-described phase averaging and limiting of the index signal. To achieve the desired phase averaging the bandwith of the index amplifier on either side of its 9 MHz center should preferably be less than the triplet frequency, (e.g. 6 MHz); and in practice it is usually sufficient to use bandwidths of at least ± 10 to about ± 20 percent, or at least 1.2 MHz to about 2.4 MHz overall bandwidths. The greater bandwidth can accomodate greater sweep non-linearity, and the smaller bandwidths can tolerate less index signal, as for example from a blacker picture.

The output signal of circuits 120 is applied through frequency doubler 122 to output lead 108 to produce the desired output signal at frequency 3 $f_t$ (18 MHz) and to apply it as one signal input to mixer 100. The output of circuits 120 is also applied to the frequency-multiplier input of the 4/3 frequency counter 126 to produce an output signal at 2 $f_t$ (12 MHz); the latter signal is applied through the delay compensation circuits 128 to the output lead 113 for application to the remodulators 84 and 86 as described previously herein. The delay compensation circuits 128 may be of any convenient form, for example including appropriate discrete-component delay lines or cascaded bandpass filters, the value of the phase delays produced thereby on lines 113 and 129 being selected to compensate for the various delays in the entire index control circuitry, so as to maintain a preset desired phase relation for the chrominance signal applied to the grid of the color tube 24, and for the deflection-speed modulation applied to the auxiliary yoke 42, despite variations in scanning speed. To this end, the delay provided by circuits 128 for the signals therethrough on line 113 is chosen to properly compensate for the time delay through the beam intensity modulation feedback path comprising light pick-up 112, index processing circuits 28, chrominance signal processing circuits 20, phase shifter 144, adder 18, amplifier 70, and tube 24. Likewise the delay on the other output line 129 from delay compensation circuit 128 is chosen to compensate for the time delay through the beam deflection modulation feedback path comprising light pick-up 112, index processing circuits 28, deflection-speed modulation circuits 54, yoke driver 155, deflection means 50, and CRT 24. Thus, the two output signals from delay compensation circuits 128 may each have different delays.

The output of frequency doubler 122 and the output on lead 129 from delay compensation circuit 128 are also applied as inputs to the heterodyne mixer 132, which responds thereto to produce, on its output lead 134, a signal at the triplet frequency $f_t$ (6 MHz). The latter signal is passed through the frequency tripler 136 to the output lead 114 to produce thereon the desired output signal of frequency 3 $f_t$ (18 MHz).

This 18 MHz signal differs from that on line 108, in that the latter is not compensated for loop time delay, while the signal on line 114 is thus compensated so that changes of sweep speed will not cause appreciable errors in phase of deflection-speed modulation.

The index pulses from photosensitive device 112 are also supplied to the 6 MHz starting circuits 140, which select a component of the starting index signals at frequency $f_t$ (6 MHz). The starting circuits 140 and the frequency counter 126 are interconnected and so constituted as to cause the frequency counter to start in the desired proper phase, as has been described particularly in my above-described patents and patent applications and not need be described in detail herein, suffice it to say that the 4:3 counter herein can comprise a 2:3 counter of my earlier patents, with a frequency doubler on its output.

Considering now the deflection-speed modulation circuits 54 as shown in more detail in FIG. 17, it is first pointed out that the output of mixer 100 on lead 142 comprises the television chrominance information modulated on a carrier of center frequency $f_t$ (e.g. at 6 MHz), since mixer 100 is supplied at one input with the 12 MHz chrominance signal and at its other input with the 18 MHz index signal from lead 108. The 6 MHz chrominance signal on lead 142, as described below, is the main chrominance drive for controlling the beam intensity of the tube 24. For some drive conditions, such as to obtain desired conduction angles or duty cycles in the beam of the tube, it is desirable to provide a further auxiliary compensation to the luminance signal, proportional approximately to the amplitude of the chrominance. Toward this objective there is provided a diode **142*a* fed by the chrominance signal on line 142; and the output of this diode feeds an RC average circuit 142*b*, which integrates the output from diode 142*a*** over a few triplets, and then feeds the smoothed output into the Y video circuits where it is added to the beam-intensity control video luminance signal.

The 6 MHz chrominance signal on lead 142 is also supplied by way of adjustable phase shifter 144 to the adder or summing circuit 118, wherein it is combined with the corrected Y signal from Y video circuits 16, and passed through amplifier 70 to the beam-intensity controlling element 30 of the color television tube 24. Importantly, the 6 MHz chrominance signal is also supplied from adjustable phase shifter 144 to the microdeflection yoke 50 by way of an optional phase quantizer 148, a further adjustable phase shifter 150, a variable gain amplifier 152, a limiter 153, an adder 154, microdeflection yoke driver 155 and lead 156. The function of the optional phase quantizer 148 will be described in detail hereinafter, and for the purpose of the present explanation it will first be assumed that it is not used, and that therefore phase shifter 150 has its input fed directly from the output of phase shifter 144. The limiter 153 serves to limit the amount of deflection-speed modulation to a safe maximum to prevent such over-modulation of deflection speed as would produce retrogression of enhanced performance as discussed previously herein. It will be appreciated then, that when the variable-gain amplifer 152 is operating in a relatively high gain condition, the chrominance signal information will be applied not only to the grid 30 of the cathode-ray tube 24 but also to the deflection-speed modulation yoke 50 to produce deflection-speed modulation as described herein previously with particular reference to FIGS. 3–10, the phase and amplitude of the deflection-speed modulation being a function of the phase and amplitude of the chrominance signal on line 142.

However, as pointed out hereinbefore, it is often desirable further to control the extent of deflection-speed modulation as a function of the hue to be produced in the image in any given region thereof. In this example, the deflection-speed modulation circuits 54 operate to enhance the amount of deflection-speed modulation at the triplet scanning rate when the hue received from the transmitter calls for a primary color, to reduce it when the saturation called for diminishes or when the hue called for departs substantially from a primary color, and to apply an increased amount of deflection-speed modulation at the stripe-scanning frequency (e.g. 3 $f_t$) as the hue called for departs from primary colors or as the saturation diminishes so that for such other colors or grey the beam scanning is then slowed most at the instants when the center of each successive stripe is impinged.

To accomplish this, the 6 MHz chrominance signal on lead 142 is passed through an adjustable phase shifter 160 to a primary detector 162, which responds thereto and to the 3 $f_t$ (18 MHz) index signal also supplied thereto over lead 164 to produce at its output lead 166 a control signal which represents the relative phase of the chrominance signal with respect to the times of impingement of the beam upon the centers of the phosphor stripes of color tube 24. In particular, primary detector 162 in a form described hereinafter produces one extreme of control signal level, such as the most positive extreme, when the chrominance signal is "in phase" with scanning of the centers of phosphor stripes of any color, i.e. when a primary color is to be produced, and it produces no signal or a decreased signal level or an opposite polarity signal as the chrominance signal phase departs from that producing primary color. The latter control signal on lead 166 is passed through suitable gain-control circuits 168 and over lead 170 to one gain-control input of the variable gain amplifier 152, to maintain the gain of the latter amplifier near its maximum value when a primary color is to be produced and to decrease its gain when hues progressively further from primaries are to be produced. Accordingly, the signal supplied over lead 156 to yoke 50 will enable maximum deflection-speed modulation at the triplet-scanning rate when primary colors are being produced, and a decreasing amount of deflection-speed modulation for colors progressively further from primaries.

The gain-control circuits 168 may be selected and adjusted to provide any desired type of variation in the amount of deflection-speed modulation as a function of departure of hue from primary colors. For example, as described previously, in a system utilizing a screen like that of FIG. 2, and in which substantial variation in beam spot size occurs, or in a system utilizing a screen such as that shown in FIG. 2A with guard bands between neighboring phosphor stripes, the deflection-speed modulation at $f_t$ is preferably made zero when the hue departs substantially from that of a primary color. The latter arrangement is also useful, for example, where the previously-mentioned hue discrepancies due to the effects of very large deflection-speed modulations on index phase are considered objectionable for hues departing appreciably from primary colors.

In addition, circuits 54 in FIG. 17 include apparatus for providing an increasing amount of deflection-speed modulation at stripe-scanning frequencies when the deflection-speed speed modulation at triplet frequency is decreased; at the same time FIG. 17 shows a method of providing an increasing amount of variation of beam intensity at the stripe-scanning frequency to increase the beam intensity when the center of each stripe is scanned. As explained previously herein, such increased activation of the centers of the stripes can increase image brightness and also produce a degree of enhancement of the saturation of at least some of the colors intended to be saturated.

However, I have found that it is not as important or useful to modulate the beam intensity at the stripe frequency when the beam position is modulated at stripe frequency, as it is in prior systems not using the deflection-speed modulation described herein, as for example in my application Ser. No. 187,741 filed Oct. 8, 1971, entitled "Television Image-Display System," in which there is considerable advantage derived from varying the beam intensity at the stripe-scanning rate. To provide both the optional beam intensity modulation at stripe frequency as above described and the deflection-speed modulation at stripe frequency, the signal on primary detector output lead 166 is used by the gain-control circuits 168 to control the gain of a second variable-gain amplifier 180 in a manner generally complementary, or opposite, to the gain control of variable-gain amplifier 152. More particularly, the signal at 3 $f_t$ (18 MHz) on lead 114 is supplied to the signal input of the variable-gain amplifier 180, and thence through adjustable phase shifter 182, limiter 183, adder 154, yoke driver 155 and lead 156 to accomplish deflection-speed modulation at the stripe scanning rate. Phase shifter 182 is adjusted so that minimum forward deflection speed is produced while the beam is scanning substantially the center of each phosphor stripe, thus enhancing the degree of actuation of each stripe at such times and thereby improving brightness and color saturation as when saturated complement colors are to be produced. Limiter 183 prevents excessive amounts of deflection-speed modulation from occurring. In addition, the 18 MHz signal from variable-gain amplifier 180 may be supplied to the grid 30 of color tube 24 by way of adjustable phase shifter 184 and adder 18 in a phase to increase the beam intensity as it scans the center of each stripe. The above-described control of the gain of variable-gain amplifier 180 causes reduced or zero deflection-speed modulation and beam intensity modulation at stripe-scanning rate whenever the color to be rendered is near a saturated primary color. Thus there is accomplished an enhancement of image saturation and/or brightness by slowing the beam scanning selectively on the appropriate one color of phosphor stripe when a primary color is to be produced, and by slowing the beam scan at the center of each phosphor stripe (and enhancing the beam intensity) when colors differing substantially from saturated primaries are to be produced.

Figure 18:
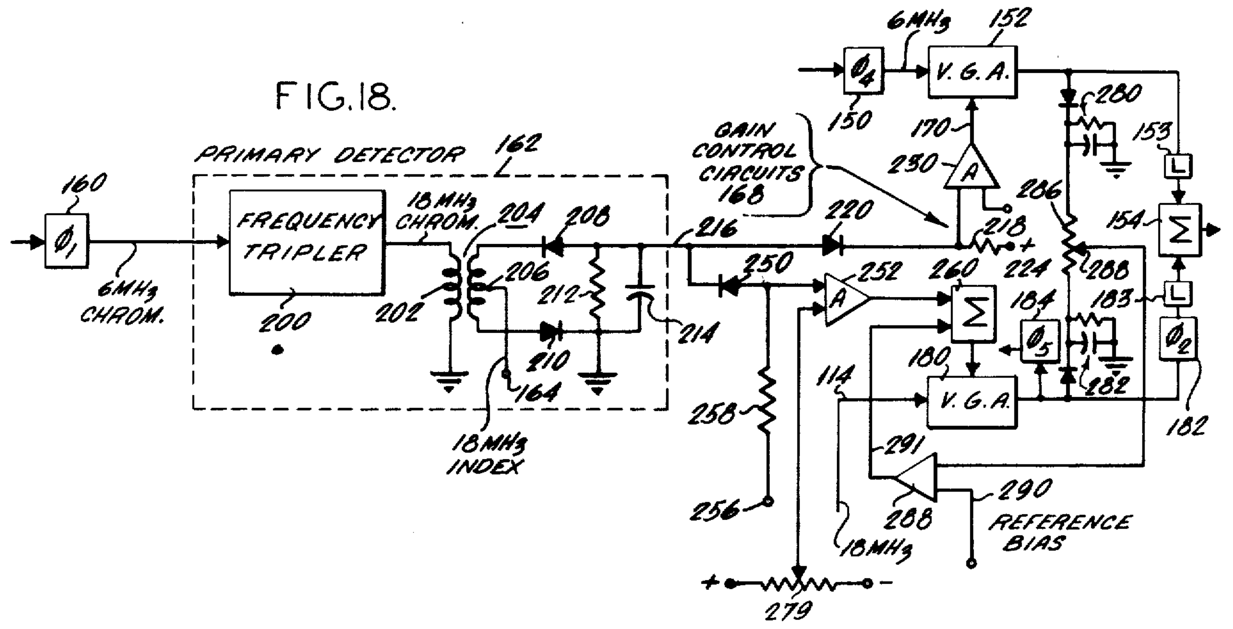
FIG. 18 is a schematic diagram illustrating one suitable form of primary detector means and gain control means to control the relative amounts of microdeflection at group frequency and at stripe frequency, for use in the system of FIG. 17.

FIG. 18 shows in more detail one preferred arrangement for accomplishing such deflection-speed modulation, and parts corresponding to those of FIG. 17 are indicated by corresponding numerals. In this example, the primary detector 162 comprises a frequency tripler 200 which triples the frequency of the input 6 MHz chrominance signal supplied thereto from the phase shifter 160, to produce an 18 MHz chrominance signal across the primary 202 of transformer 204. The transformer secondary center tap 206 is supplied with the 18 MHz index signal from lead 164, and a pair of oppositely-poled diodes 208 and 210 are connected to respectively opposite ends of the transformer secondary. The output ends of these two diodes are interconnected by an RC circuit comprising resistor 212 and capacitor 214 in parallel and having a time constant comparable to the time required to scan a few triplets in the image screen. The circuit just described acts as a phase detector to produce its most positive output on output lead 126 when the 18 MHz index signal and the 18 MHz chrominance signal are exactly in phase, which will, with proper adjustment of phase shifter 160, occur whenever a primary color is to be presented. As the phase of the chrominance signal shifts away from the phase producing a primary color, the output voltage at lead 216 decreases through zero for phases producing intermediate hues and to an extremal negative value for phases producing complements; the latter extremal negative value occurs when the 18 MHz index signal and the chrominance signal are exactly out of phase.

The gain control circuits 168 of FIG. 18 include a diode rectifier 220 the anode of which is connected to primary detector output lead 216 and the cathode of which is connected through a resistor 222 to a bias terminal 224 which may be biased positively to an adjustable degree. The positive bias supplied to terminal 224 is less than that appearing at output lead 216 when a saturated bright primary is being produced, so that diode rectifier 220 is then conductive and produces a more positive voltage on one input to D.C. amplifier 230, whereby variable-gain amplifier 152 is caused to have its maximum gain. Accordingly, when a primary color is being produced, the 6 MHz signal supplied from phase shifter 150 and passed through variable-gain amplifier 152, limiter 153, adder 154 and yoke driver 155 to yoke 50 (see FIG. 17) is delivered with maximum gain. When the phase of the chrominance signal departs from a phase producing a primary or when the saturation of the primary decreases, the voltage of output terminal 216 decreases until diode rectifier 220 cuts off, under which condition variable-gain amplifier 152 has a minimum gain, producing negligible deflection-speed modulation. The extent of departure from a fully saturated primary for which cut-off of rectifier 220 occurs and deflection-speed modulation is rapidly reduced may be selected by adjustment of the bias supplied to bias terminal 224.

In addition, in FIG. 18 a diode rectifier 250 is supplied at its cathode with the control signal from primary detector output lead 216, and its anode is connected to one input of a D.C. amplifier 252. An adjustable bias is supplied to the anode of diode 250 from negative bias terminal 256 by way of resistor 258 to determine the threshold value of the voltage on output lead 216 for which conduction would cease through rectifier 250. If the voltage on lead 216 were to be driven above this threshold in a more positive-going direction, conduction through diode 256 ceases. When the phase of the chrominance signal shifts sufficiently from that producing a primary, (or when the amplitude of the chrominance signal saturation is sufficiently small) to cause rectifier 250 to conduct, the resultant more-negative control voltage applied to amplifier 252 acts through adder 260 to increase the gain of the variable-gain amplifier 180. The latter variable-gain amplifier is supplied at its signal input with the delay-compensated 18 MHz index signal on lead 114 as described previously, and, over a range of hues, assumes a progressively higher gain condition as the chrominance signal phase departs from the phase of a pure primary toward the phase that produces color complements. Accordingly, a progressively larger amplitude of 18 MHz signal is supplied through phase shifter 182, limiter 183, adder 154, yoke driver 155 and lead 156 to microdeflection yoke 50 (see FIG. 17), thereby to produce increasing amounts of deflection-speed modulation at the stripe scanning rate (18 MHz) as the hue departs from primary color, or as the saturation of the primary is decreased. The magnitude of the 18 MHz signal used for deflection-speed modulation for any given hue-saturation condition may be selected by adjustment of the gain of amplifier 252, which is determined by the setting of the tap on bias divider 279. The 18 MHz signal from variable-gain amplifier 180 is supplied through phase shifter 184, adder 18 and amplifier 70 to the grid 30 of color tube 24 (see FIG. 17) to produce pulsed increases in beam intensity as the center of each stripe is scanned. Phase shifter 184 may include a gain adjustment such as a variably-tapped voltage divider to permit adjustment of the amount of beam pulsing produced for any given hue.

Although not essential, in a preferred embodiment of the arrangement depicted in FIG. 18 the biases of the rectifiers 220 and 250 and the gains of the several elements are adjusted so that as the triplet rate deflection-speed modulation decreases, the stripe rate deflection speed modulation increases. To provide this operation, the biases supplied to terminals 224 and 256 may be adjusted so that as the voltage on line 216 starts to fall from its most positive value, rectifier 250 begins to conduct before rectifier 220 is cut off. The gain of variable-gain amplifier 180 is preferably also controlled, as shown in FIG. 18, in part by an automatic gain control circuit (AGC) which responds to a voltage proportional to the sum of certain proportions of the outputs from the two variable gain amplifiers 152 and 180. More particularly, the output of variable-gain amplifier 152 is applied to an envelope detector 280 comprising a conventional arrangement of diode rectifier and shunt RC circuit having a time constant equal to about the time required to scan a few triplets in the color tube screen, and which produces at the cathode output terminal of the envelope detector a uni-directional voltage varying in magnitude in accordance with the amplitude of the signal from variable-gain amplifier 152. A similar envelope detector 282 is connected to the output of variable-gain amplifier 180 to produce at its cathode output lead a unidirectional voltage varying in accordance with the magnitude of the output signal from the variable-gain amplifier 180. A combining resistor 286 is connected between the cathodes of the two envelope detector rectifiers, and the signal at the tap 288 on resistor 286 feeds a difference amplifier 288 to which a reference bias voltage is also supplied on lead 290. The output voltage of amplifier 280 on lead 291 therefore tends to swing in one direction or the other, depending upon whether the signal at tap 288 is above or below the reference bias on lead 290. This output of D.C. amplifier 288 is fed to one input of adder 260, so as to act on variable-gain amplifier 180 in degenerative manner and thereby produce an AGC control. The control voltage actually reaching the variable-gain amplifier 180 is therefore the sum of this AGC voltage and the control voltage from amplifier 252. The output voltage supplied from variable-gain amplifier 152 to the microdeflection yoke is unaffected by this arrangement, but the control action exerted on the variable-gain amplifier 180 is as follows. Assuming first for convenience that the tap 288 is positioned at the center of resistor 286, when a primary color is being represented variable-gain amplifier 152 will be operating in its maximum gain condition and the AGC voltage at tap 288 will represent essentially one-half of the amplitude of the 6 MHz signal from variable-gain amplifier 152. If the primary color to be represented is highly saturated, the voltage at the cathode of the diode in envelope detector 280 will have its maximum value, and the half of this value fed back degeneratively as described to variable-gain amplifier 180 will be sufficient to assure that variable-gain amplifier 180 remains in its negligible-gain condition. However, if the primary color is less saturated, or if the hue is shifted somewhat away from that of a pure primary, the 6 HHz signal out of variable-gain amplifier 152 will decrease, because of either a decrease of input signal thereto from phase shifter 150, or because of a decrease in control voltage on lead 170, or both. When the output of variable gain amplifier 152 is thus decreased, the degenerative AGC voltage feedback to the control input of variable gain amplifier 180 will act in a direction to cause the gain of the latter amplifier to increase progressively to permit an increasing amount of the 18 MHz signal to be passed to the microdeflection yoke 50. Accordingly, for primary colors of high saturation the deflection-speed modulation will be mainly at the triplet scanning frequency, and as the primary color becomes saturated or shifts in hue away from a pure primary color, the deflection-speed modulation will become progressively smaller at triplet scanning frequency and progressively greater at the stripe-scanning frequency. It is noted also that the AGC feedback voltage at tap 288 also increases with output from the variable-gain amplifier 180. Accordingly, as the intended hue or saturation shifts away from a saturated primary, the decrease in AGC voltage at tap 288 due to the decrease in the output of variable-gain amplifier 152 will be counteracted by a nearly equal increase in the component of AGC voltage due to increasing amounts of 18 MHz signal through variable-gain amplifier 180. This intermediate condition can obtain either when both rectifiers 220 and 250 are conducting or even in the absence of conduction by rectifier 250, if the AGC loop gain be made high. Such may occur, for example, in representing certain colors intermediate the complements and primaries. Then, the percentage of AGC voltage due to the two variable-gain amplifiers will shift from being nearly entirely due to variable-gain amplifier 152 near a primary, to being nearly entirely due to output from variable-gain amplifier 180 as complement colors are approached. Thus when the hue is shifted sufficiently that rectifier 220 is cut off, the AGC voltage for variable-gain amplifier 180 will be derived entirely from its own output.

Adjustment of the tap 288 downward will cause a stronger AGC action on non-saturated primary colors and on non-primary colors, and thus cause a smaller amount of deflection-speed modulation at stripe-scanning rate compared to the amount of deflection-speed modulation at triplet scanning rate produced on saturated primary colors. It will thus be understood that if the above described AGC circuit is employed, the various circuits comprising diode 250 and amplifier 252 and reference voltage sources 279 may be omitted; and whether or not the AGC is employed, the various biases and gains in the system may be adjusted to provide the desired smooth shifting from triplet-rate deflection-speed modulation at or near saturated primaries to stripe-scanning rate deflection-speed modulation for primaries of low saturation, and for other hues, and for non-colored parts of the picture.

Figure 19:
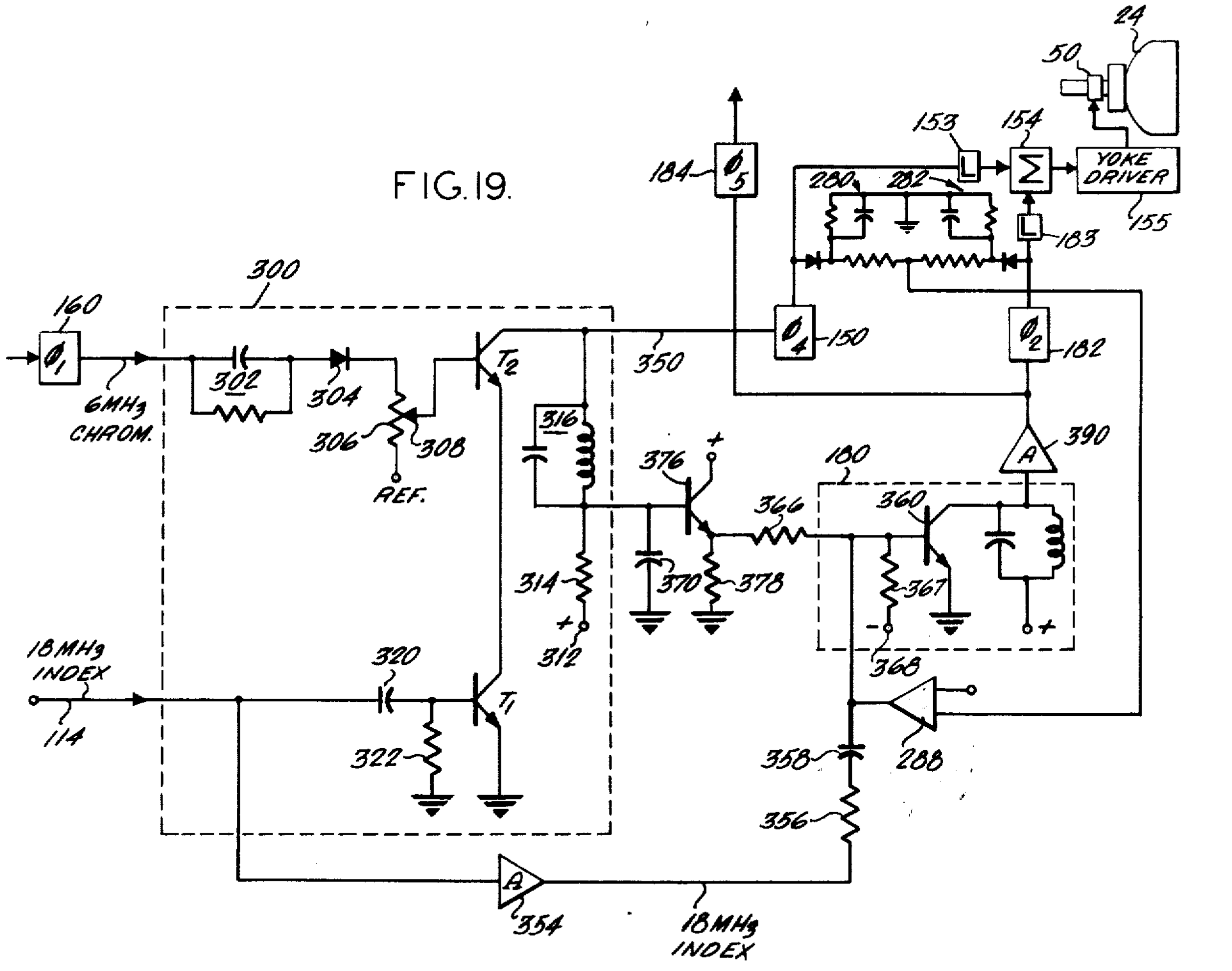
FIG. 19 is a schematic diagram illustrating an alternative form of circuit, including phase quantizing, for use in the system of FIG. 17.

FIG. 19 illustrates a simple form of deflection-speed modulation circuit differing from that shown in FIG. 18 in several respects. While a variable-gain amplifier 180 is still utilized to control the amount of 18 MHz index supplied to the microdeflection yoke and to the grid of the cathode-ray tube, the functions of the other variable-gain amplifier 152 and of the primary detector 162 are combined in a common circuit 300 which also performs the function of the phase quantizer 148 of FIG. 17. Parts corresponding to those of FIG. 18 are indicated by corresponding numerals.

In FIG. 19, the 6 MHz chrominance signal from phase shifter 160 is applied to a half-wave rectifying and peak-sensing circuit connected to the base of transistor $T_2$. More particularly, the 6 MHz chrominance signal is supplied to a series circuit including a parallel RC circuit 302 having a time constant corresponding to the time to scan a few triplets, and then to a diode 304 and and a load 306, the cathode of the diode being connected to reference potential through the load resistor 306. A tap 308 on the latter resistor is connected to the base of transistor $T_2$.

Figure 20A:
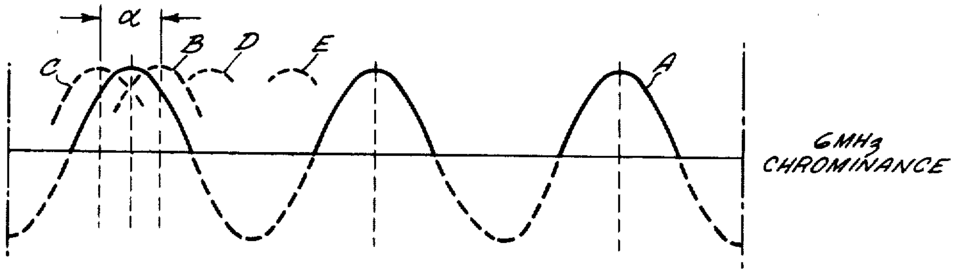
FIGS. 20*a* through 20*g* are graphical representations to which reference will be made in explaining the operation of the circuit of FIG. 18.
Figure 20B:
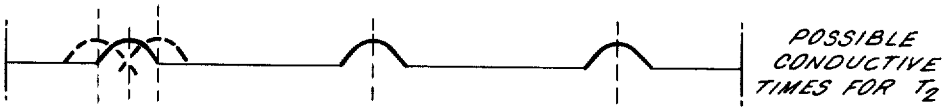

Referring to FIG. 20*a*, in which ordinates represent voltages or currents and abscissae represent time, curve A thereof represents the 6 MHz chrominance signal such as occurs when primary red is to be produced, the half-wave rectified portion of the signal being shown in solid line and the deleted negative portion being shown in broken-line. The effect of the circuit 302, 304, 306, 308 is to render transistor $T_2$ conductive only when the peaks of the 6 MHz chrominance signal occur, e.g. only during the small ranges of phase-angle such as alpha in FIG. 20*a*, centered at the peaks of the chrominance signal; any of a variety of conventional circuits other than that shown may be utilized to provide this operation. Also shown in broken line in FIG. 20*a* are two other phases of the half-wave rectified 6 MHz chrominance signal, that shown at B being slightly advanced in phase, and that shown at C being slightly retarded in phase with respect to the signal of curve A. Curve D of FIG. 20*a* represents the peak portion of the same 6 MHz chrominance signal when it has a phase for which primary green is to be produced, and curve E is the peak for blue. FIG. 20*b* is a graph having coordinates like that of FIG. 20*a*, and pulses therein representing the times during the peak of the chrominance signal when transistor $T_2$ is rendered conductive, the solid curve corresponding to the solid curve A of FIG. 20*a*, and the dotted curves corresponding to the phase advanced and phase-retarded chrominance signals illustrated at B and C in FIG. 20*a*. The conduction time duration is controlled by the reference potential and by the ratio of the resistance in the RC circuit 302 to the total resistance in the series circuit, including the resistor 306. The higher this ratio is made in the design, the shorter will be the conduction angle alpha.

Transistor $T_2$ is supplied with positive operating collector bias from supply terminal 312 by way of a video load resistor 314 and a tank circuit 316 resonant at the triplet frequency here assumed 6 MHz, and its emitter is returned to ground by way of the collector-emitter path of another transistor $T_1$, so that transistor $T_2$ cannot conduct appreciably even during its conductive intervals shown in FIG. 20*b*, unless transistor $T_1$ is also simultaneously conductive.

Figure 20C:
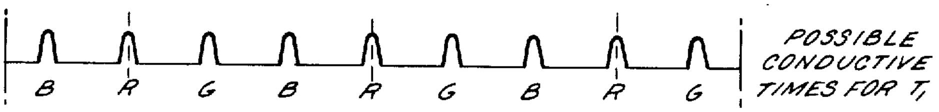
Figure 20D:
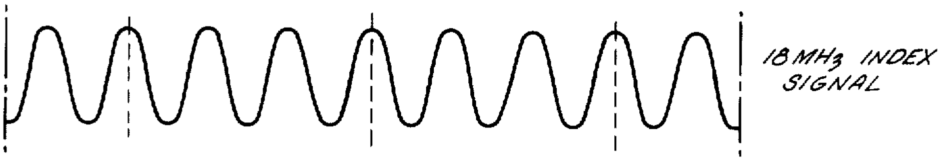

The 18 MHz index signal supplied from lead 114 of FIG. 17 and shown in FIG. 20*d*, is applied in FIG. 19 through capacitor 320 to the base of grounded-emitter transistor $T_1$, the base of which transistor is connected to ground through resistor 322. The values of capacitor 320 and resistor 322 are chosen so that current pulses flow through the base-emitter path of transistor $T_1$ and render it conductive only during short intervals occurring near the peaks of the 18 MHz index signal supplied thereto, these times of occurrence of the conductive state of transistor $T_1$ being shown by the pulses in FIG. 20*c*.

Figure 20E:
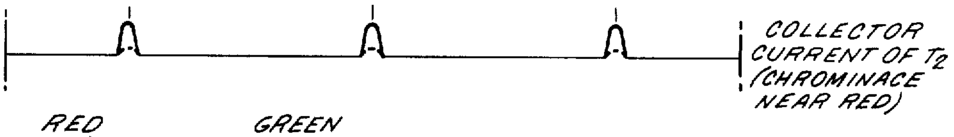

Accordingly, conduction will occur through transistor $T_2$ only when the conductive times of $T_2$ shown in FIG. 20*b* are contemporaneous with the conductive times of transistor $T_1$ shown in FIG. 20*c*. Since the peaks of the 18 MHz index signals represent accurately those times at which the cathoderay tube beam is scanning the centers of the phosphor stripes, conduction through transistor $T_2$ can only occur when the chrominance signal is representing substantially a primary color. Thus FIG. 20*e*, having a time scale like that of the other groups 20*a*–20*d*, represents in full line the pulses of current through transistor $T_2$ which will be produced only when a primary color is being represented, and the smaller-amplitude broken line curves in FIG. 20*e* represent the reduced-amplitude pulses of current produced when the chrominance signal shifts slightly in phase into either the advanced or retarded phase positions shown in curves B and C of FIG. 20*a*. Further shift of phase of the chrominance signal away from the phases which produce a primary will result in the pulses of current through transistor $I_2$ decreasing further, and rapidly reaching zero. It is noted that the pulses of current as shown in FIG. 20*e* are of substantial value only when the chrominance signal is representing primary red or substantially primary red, and occur substantially at the times when the centers of the red phosphor stripes are being scanned.

It is also noted that the pulses of current in the collector of transistor $T_2$ will be of reduced size when the color saturation called for is reduced, as represented by reduced amplitude of 6 MHz signal fed into its base. This is as desired, to make the amplitude of the deflection-speed modulation smaller when the degree of saturation of the primary being displayed is reduced by transmitter instructions, falling eventually to zero amplitude when there is no chrominance signal fed into the base of the transistor $T_2$, indicative of a signal of gray, or black, or white, having no color.

Figure 20F:
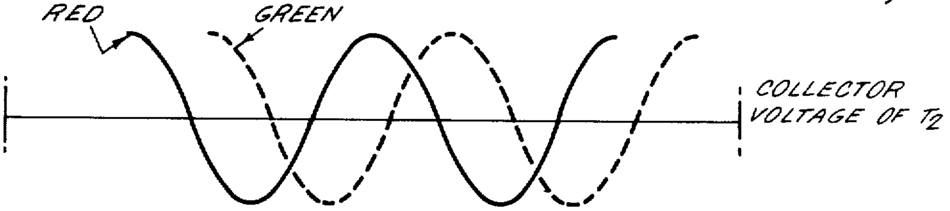

The pulses of current through transistor $T_2$ produce an in-phase ringing of the tank circuit 316, producing across the tank circuit the sinewave of voltage represented in FIG. 20*f*, which is at the 6 MHz chrominance signal frequency but of substantially fixed phase such that its peaks correspond closely to times when the centers of particular red color stripes are being scanned. Relatively small deviation of the chrominance signal phase from that producing primary red will reduce the amplitude of the signal of FIG. 20*f* towards zero but will not materially change its phase, because conduction through $T_2$ can only occur substantially at the centers of the 18 MHz pulses of FIG. 20*c*. Accordingly, the just-described portion of the circuit of FIG. 19 operates to sense when the chrominance signal is representing primary red, and to produce a 6 MHz deflection modulation signal to slow beam-scanning to a minimum at the centers of the red phosphor stripes, with the slowing action to be strongest when the hue to be presented is pure red or very close thereto, and when the chrominance signal amplitude or saturation of the red to be presented is greatest.

Figure 20G:
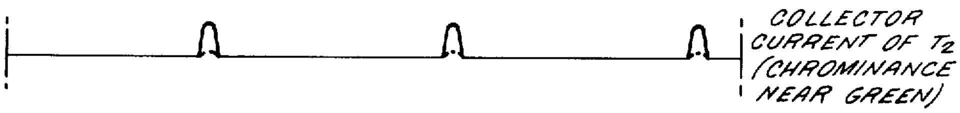

FIG. 20*g* illustrates the fact that if the phase of the chrominance signal in FIG. 20*a* is such as to represent primary green, as shown at B of FIG. 20*a*, pulses of current will again occur in the collector of $T_2$, but in this case at the times shown in FIG. 20*g*. These pulses in turn will produce an in-phase 6 MHz signal at the collector of transistor $T_2$, as represented in the broken-line graph of FIG. 20*f*, the peaks of which occur at times corresponding to the times when the beam is scanning the centers of the green stripes. Similarly, when the chrominance signal has a phase representing primary blue, 6 MHz signals at the collector of $T_2$ will have peaks corresponding to the times of scanning of the centers of the blue stripes.

The 6 MHz signal in FIG. 19 produced on lead 350 from the collector of transistor $T_2$ when primary colors are to be produced is then supplied through phase shifter 150, limiter 153, adder 154 and yoke driver 155 to the deflection-speed modulation yoke 50 of the color tube. It will be understood that by adjustment of 150, it is so supplied to yoke 50 that it will have the phase necessary to produce slowest scanning by the beam as it scans the centers of those stripes corresponding to the primary color then to be reproduced, thus resulting in the desired increase of saturation and brightness under these conditions. When the hue of the color to be presented departs slightly from a primary, a deflection-modulation signal will still be produced, and with a phase such as to still slow the beam most when it is scanning nearly the centers of the corresponding colored stripes. Thus the phase of the deflection-speed modulation signal is quantized in the sense that if it departs substantially from the phases producing primaries it will produce no deflection-modulation, while if its phase is anywhere within a small range alpha of that producing a primary, it produces a single phase of deflection-modulation signal accurately phased to slow the beam most when the beam is centered with respect to the stripes of the primary color near that to be represented, and hence produces maximum enhancement of saturation and brightness for primary and near-primary colors.

The 18 MHz index signal in FIG. 19 on lead 114 is also supplied, through a suitable amplifier 354 and a coupling series RC circuit (356), (358) to the base of the transistor 360, which serves as an amplitude modulator of 18 MHz. Transistor 360 is supplied with appropriate base bias, with a tuned collector circuit, and with a conventional collector-voltage supply so as to act as a variable-gain amplifier in response to changes in base current bias. More particularly, the gain of transistor 360 is varied in accordance with the variation in base current supplied thereto by way of the resistor 366. The desired control of the current through resistor 366 is accomplished by means of a resistor 314 in series with the collector tank circuit of transistor $T_2$, effectively shunted by a capacitor 370 serving as a 6 MHz bypass, but small enough in value to let variations in saturation of the chrominance signal (0 to about 0.3 MHz) pass readily. When transistor $T_2$ is being rendered repetitively conductive by a chrominance signal representing a primary or near-primary, the voltage developed across resistor 314 and applied to the base of emitter-follower transistor 376 becomes more negative, rendering the latter emitter-follower transistor less conductive and causing the voltage at its emitter electrode to become more negative and reducing the gain-control current through resistor 366 into the base of transistor 360. The effect of this is to reduce the gain of transistor 360. By proper choice of bias on terminal 368 fed to resistor 367, or by proper choice of value of 367 compared to 366, the gain of transistor 376 can be made to become very low when 6 MHz signals are being produced at the collector of transistor $T_2$. When the latter signals are absent, as will be the case when a color differing substantially from a saturated primary is to be produced, the gain of transistor 360 will increase and the 18 MHz index signal will be supplied at a relatively high level through auxiliary amplifier 390, phase shifter 182, limiter 183, adder 154, and yoke driver 155 to the auxiliary beam deflection yoke 50; at such times the 18 MHz index signal may also be supplied through phase shifter 184 to the grid of the cathode-ray tube to modulate the beam intensity upwardly during the times when it is scanning near the centers of the color stripes, as desired to produce enhancement of saturation by increase of the actuation of each phosphor stripe as its center is being scanned by the beam.

In arrangments such as that shown in FIG. 1 hereof, in which the conventional horizontal and vertical deflections are produced by a magnetic yoke on the barrel of the cathode-ray tube, and the deflection-speed modulation is produced by a small auxiliary deflection yoke positioned about the same barrel, electrical or magnetic interaction can occur between the two yokes which is in some cases undesirable. For example, microdeflection yoke 50 may comprise a first loop of 5 to 10 turns of wire bent around the upper half of the barrel of the neck of tube 24, and a second similar loop bent around the lower half of the barrel, the two loops being supplied with the deflection-speed modulation signal so that the magnetic fields of the two coils act additively on the cathode-ray beam. Such a relatively-low-impedance microdeflection yoke magnetically coupled to the main deflection yoke adjacent thereto can, particularly if fed by a source which is of low impedance at horizontal scanning frequency, produce undesired relatively heavy loading of the main deflection yoke, thereby requiring a greater amount of electrical input power to the main yoke than would otherwise be required. Furthermore, the relatively large currents and rates of change of current through the main deflection yoke can produce large associated magnetic fields providing coupling to the auxiliary deflection yoke and inducing disturbing voltages and currents therein; these voltages and currents can not only produce irregularities in the desired deflection signal, but in some cases, particularly where the auxiliary deflection yoke is driven by a low power level device such as a transistor, can interfere with normal operation of the driving transistor or similar device.

Figure 21:
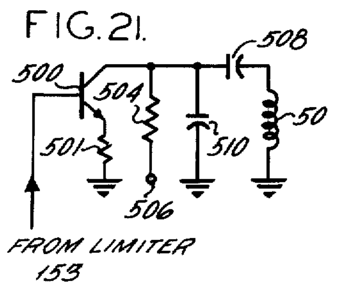
FIGS. 21 and 22 are schematic diagrams of two forms of yoke driver circuit which may be employed in the invention.

To minimize such difficulties, a further preferred feature of the invention is shown in FIG. 21, comprising a form of circuit suitable for use as the yoke driver 155 of FIG. 17 in applications in which the 18 MHz deflection modulation is not used. The circuit of FIG. 21 utilizes capacitive means for effectively providing series resonance with the inductance of the auxiliary deflection yoke 50 so that, while the 6 MHz deflection-speed modulation currents are efficiently delivered to the auxiliary deflection yoke, little or no voltage appears on the collector of output transistor 500 due to voltages induced in the auxiliary deflection yoke by changing magnetic fields of the main deflection yoke; and so that the auxiliary deflection yoke does not exert substantial loading on the main deflection yoke. More particularly, the auxiliary deflection signal from limiter 153 may be applied to the auxiliary deflection yoke 50 by the yoke driver circuit of FIG. 21 in applications of the invention wherein microdeflection at $3f_t$ (18 MHz) is not used. To this end, transistor 500 is supplied at its base with the auxiliary deflection signal from limiter 153, the emitter of transistor 500 is grounded through a resistor 501, and the collector of transistor 500 is connected through a collector load resistor 504 to a suitable positive supply terminal 506. Auxiliary deflection yoke 50 is connected at one end to a source of reference potential (ground), the other end being connected to the collector of transistor 500 by way of a first capacitor 508. The collector of transistor 500 is also connected to reference potential by way of a second capacitor 510. The values of the capacitance of capacitors 508 and 510 and of the net inductance of the microdeflection yoke are selected so that the microdeflection yoke net inductance is approximately series resonant with the series combination of capacitors 508 and 510 at the 6 MHz triplet scanning frequency. Transistor 500 then drives auxiliary deflection yoke 50 through capacitor 508 to produce the desired deflection-speed modulation currents, and any voltages induced across the auxiliary deflection yoke 50 by the main deflection yoke are in effect not passed to the collector of transistor 500 if their frequency differs substantially from the nominal 6 MHz auxiliary deflection frequency, due to the resonant characteristics of the circuit as described, and the small value of capacitor 508 relative to the value of resistor 504 for frequencies involved in the main yoke. Since the main deflection signals do not contain any substantial component at the 6 MHz microdeflection frequency, there will be little coupling of the main deflection signals into the collector circuit of the transistor to interfere with the operation thereof or to adversely affect the microdeflection operation, and the microdeflection circuit will not exert substantial loading on the main deflection yoke.

Further advantages of the circuit of FIG. 21 in allowing the transistor to operate class B, while not causing unwanted shifts of beam center position, are discussed in connection with FIGS. 21 and 22 below.

Figure 22:
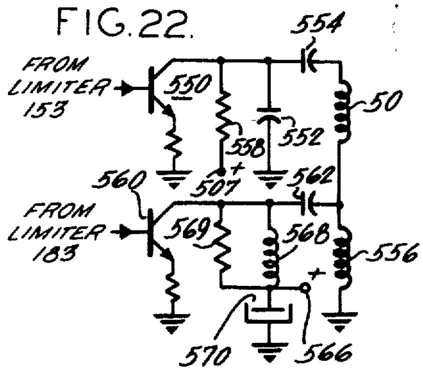

FIG. 22 illustrates a suitable circuit arrangement for a combination of yoke driver 155 and adder 154, where both the 6 MHz and the 18 MHz microdeflection signals are to be applied to the auxiliary deflection yoke. In this circuit, a transistor 550 connected in grounded-emitter circuit configuration is again supplied at its base with the 6 MHz microdeflection signal from limiter 153. A capacitor 552 is connected between the collector of transistor 550 and reference potential, or ground, and one end of the microdeflection yoke 50 is connected to the collector of transistor 550 through another capacitor 554. The opposite end of the microdeflection yoke 50 is connected to reference potential by way of small series inductor 556. Collector supply voltage is provided for transistor 550 from a suitable positive supply source 557 by way of a collector load resistor 558.

The 18 MHz signal from limiter 183 is applied to the base of another grounded-emitter transistor 560, the collector of which is connected through a capacitor 562 to the lower end of the microdeflection yoke 50 and is also connected to a suitable positive supply potential source 566 by way of an inductor 568. Resistor 569 is also connected between the transistor collector and source 566. The collector supply source 566 for transistor 560 is preferably bypassed to ground by capacitor 570.

In the circuit of FIG. 22, the series combination of the net inductance of auxiliary deflection yoke 50 and the inductance 566 is resonant with the series combination of capacitor 554 and capacitor 552 at approximately the nominal 6 MHz microdeflection frequency. Also the parallel combination of the net inductance of auxiliary deflection coil 50 and the inductance 556 in series with inductance 566 is made series resonant with the series combination of capacitors 562 and 554, to resonate in series at approximately the stripe scanning frequency on 18 MHz. The circuit arrangement of FIG. 22 is thus effective to supply both the 6 MHz and 18 MHz signals to the deflection modulation yoke 50 as desired; in addition, the above-described resonating of yoke 50 at 6 MHz and at 18 MHz provides the desired isolation between yoke 50 and the main deflection yoke 42.

It is also noted that in the circuits of FIGS. 21 and 22 capacitors 554 and 562 block the supply of D.C. from the transistors to the auxiliary deflection yoke 50. This is particularly advantageous in that there is no need to stabilize the D.C. operating voltages of the collectors of the two transistors, and in fact both transistors may be operated single ended class B with resultant economy, and allowing inherent variations in D.C. collector current and voltage, without causing corresponding D.C. variations through the auxiliary deflection yoke which otherwise would produce undesired deflections of the cathode-ray beam.

In one typical embodiment of the circuit of FIG. 22, wherein the microdeflection yoke 50 has an inductance of about 30 microhenries, capacitors 554 and 552 may each have a value of about 30 $\mu\mu f$; capacitor 562 may have a value of about 5 $\mu\mu f$; and inductors 556 and 566 may have respective values of about 20 microhenries and about 4 to 7 microhenries; it being understood that the exact values used will normally be obtained by adjustment until the resonant conditions at $f_t$ and $3 f_t$ are observed.

Figure 23:
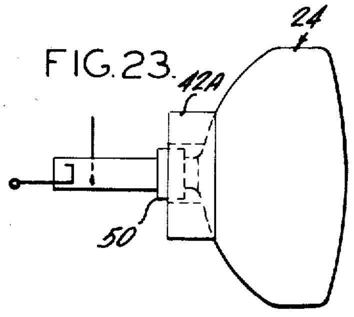
FIG. 23 is a diagrammatic view showing one preferred location for the microdeflection yoke in one aspect of the invention.

FIG. 23 illustrates another arrangement for minimizing interaction between the main horizontal and vertical deflection coil 42A on a color television tube 24 or other similar type of tube, and the microdeflection yoke 50. The central aperture of the main deflection coil 42A is made sufficiently large to encompass a portion of the microdeflection yoke, which is positioned partially within the main yoke 42A. This preferred feature of the invention utilizes the fact that the direction of the magnetic field produced within the center of the yoke 42A contains components generally opposite in direction to the field produced by yoke 42A just outside the center of the yoke. Accordingly, the portion of the auxiliary deflection yoke 50 extending within the yoke 42A will have induced therein current components in the opposite direction to those induced in the portion of auxiliary deflection yoke 50 extending outside of yoke 42A, and by adjusting the extent to which auxiliary deflection coil 50 extends within yoke 42A a substantial balancing of the effects of the opposite components of the magnetic field of yoke 42A can be obtained, with substantially zero net current induced in microdeflection yoke 50 by the currents in yoke 42A. In this way the above-described interaction between the microdeflection yoke 50 and the main deflection yoke 42 are minimized. Since the auxiliary yoke can comprise just 5 to 10 turns of Number 32 to 36 wire, the space within the main yoke which it occupies can be very small, so as not to detract from the efficiency of the main yoke. Also the auxiliary yoke and main yoke may be conveniently co-mounted as a single assembly, which is slipped over the neck of the tube 24 as a single unit.

The invention has been described with particular reference to its use as a standard color television receiver of televised broadcasts using United States standard color television broadcast transmissions. However, it is recognized that these standards may change from time to time, that standards of other countries may differ substantially from those in the United States, and that image-representing signals of a non-broadcast from such as those sent over cables, for example, may in some cases be used to operate image-display systems in accordance with the invention. Substantial modifications of the particular form of the system utilized in accordance with the invention are therefore contemplated to accomodate all such situations, including those in which the image-display device itself is not a cathode-ray tube but is some other form of scanned-image display system such as an array of light-emitting diodes, for example. I have found, in fact, that the invention in one of its forms is useful in connection with black-and-white television image-presentation. The black-and-white television tube may, for example, be provided with alternating fine vertical stripes of white light-producing phosphor and opaque stripes substantially non-reflective of room lighting, and which do not necessarily produce light in the viewing area in response to beam impingement, the vertical stripes of index and phosphor preferably each being smaller in width than the horizontal length of the minimum image detail which the television signal is capable of producing. Appropriate index stripes and index circuits are also provided, using for example 3 index elements for each two pairs of doublets, each of which has a bright and a black stripe. By then using deflection-speed modulation of the beam to cause it to dwell most of the time on the white phosphor stripes (at which times the beam is preferably most intense), and only briefly on the black stripes, for any given maximum average beam current most of the beam current can be used to produce useful image light, just as in the color case described in detail. At the same time, the reflectance of light from the front of the image screen is decreased in proportion to the amount of the tube front face which is covered by the opaque lines, e.g. reduced by 50 percent where the opaque lines and light-producing lines are of equal width, or reduced 80 percent where the white lines are 20 percent of the doublet pitch. If the same degree of non-reflectance of room light were provided by using a conventional uniformly-coated white phosphor screen covered with a gray face plate, it would have to absorb about 70 percent or 55 percent, respectively, of the phosphor light passing through it to again reduce the reflectance from the screen due to two-way travel through the face plate to 50 percent or 20 percent respectively; but the forward light from the screen image would be reduced by 30 percent (e.g. to 70 percent of its original value), or by 45 percent, respectively, by its one-way passage through the face plate. The method of the invention applying microdeflection to a black-and-white tube would be able to produce more than 70 percent of the incident beam energy on the white phosphor stripes, and thus produce more forward light than in the conventional system referred to, for the same average beam current or same average beam power. This can prove particularly advantageous where the TV set has limited power available, as from batteries, yet must operate in bright light, as in daylight, where portable battery-operated radios work well, but portable battery-operated TV sets lacking the features of my invention are rather poor in contrast or short in battery life.

Thus although the invention has been shown and described with particular reference to specific embodiments thereof in the interest of complete definiteness, it will be understood that it may be embodied in a variety of forms, diverse from those specifically shown and described without departing from the spirit and scope of the invention as defined by the appended claims.

What I claim is:

1. In an electrically-controlled image-display system comprising image-forming means including a plurality of similar groups of elements of different light-controlling characteristics, means for scanning said groups with a scanning entity to activate said elements in a manner to form an image, and index elements positioned to be scanned by said scanning entity during formation of said image to produce index signals representative of the position of said scanning entity:

means for producing variations in the speed of said scanning within at least one of said groups; said index elements being positioned so as to be scanned by said scanning entity at a frequency which is M/N times the frequency of scanning of said groups in the absence of said variations in scanning speed where N and M are integers and M is greater than N and other than an integral multiple of N, whereby the phase of said index signals averaged over the time of said scanning of several of said groups is not substantially adversely affected by said scanning-speed variations.

2. The system of claim 1, in which M is an odd integer and N is an even integer.

3. The system of claim 1, in which the frequency of said variations is substantially equal to the frequency of scanning of said groups by said entity in the absence of said variations, in which said elements within each of said groups are differently responsive to actuation by said scanning entity to present light of respectively different colors, and in which scanning of said elements by said entity produces a color image; said system comprising means for selectively enhancing the magnitude of said speed variations for certain hues of the color being presented by the group being scanned.

4. The system of claim 3, comprising means for producing additional variations of said scanning speed at a frequency to produce minima in the velocity of forward scanning by said entity as each of said elements of said group is being scanned, and means for decreasing the magnitude of said additional variations when the hue to be presented by said group approaches the hue presented by activation of one of the elements of that group acting alone.

5. The system of claim 4, in which said image-forming means comprises a color television cathode-ray tube, said entity comprises the cathode-ray of said tube and said groups of elements comprise groups of stripes scanned transversely by said beam, said index elements being interspersed with said stripes of said groups.

6. The system of claim 1, in which said elements within each of said groups are differently responsive to activation by said scanning entity to present light of respectively different colors, and in which said scanning of said elements by said entity produces a color image.

7. The system of claim 6, comprising means for controlling the time phase of said variations in scanning speed to cause them to oppose forward scanning by said scanning entity most strongly when said entity has approximately that position within said at least one group which causes presentation of light of the hue desired to be presented by that group.

8. The system of claim 7, comprising means for controlling the magnitude of said variations in scanning speed in accordance with the saturation of the color to be produced.

9. The system of claim 8, comprising means for controlling said phase and magnitude in response to a received color television signal.

10. The system of claim 8, comprising means for controlling said phase and magnitude in response to the chrominance component of a received color television signal.

11. The system of claim 1, in which said elements within each of said groups are differently responsive to actuation to present light of respectively primary colors; said system comprising means for varying the intensity of said scanning entity in response to a color-controlling signal to actuate said groups of elements in a manner to form a color image and also comprising means for producing a maximum reduction in the forward velocity of said scanning in response to representation by said color-representing signal of a hue anywhere within a limited range of hues near the hue of one of said primary colors, when said entity is substantially centered with respect to one of said elements producing said one primary color.

12. In a color-image forming system comprising an image-presentation device including a scanning entity, screen means containing groups of a number of differently colored light presenting elements scanned successively by said entity to form a color image, and index elements interspersed geometrically with said groups and responsive to scanning by said entity to produce an index signal representative of the position of said entity during said scanning, hue detector means comprising:

means for deriving from said index elements a first signal varying synchronously with the occurrences of times when said entity is scanning said elements of said groups;

means responsive to an input color-image representing signal to produce a second signal having a frequency equal to the frequency of said first signal divided by the number of said light-presenting elements in each of said groups and having a phase representative of the hue represented by said color-image representing signal; and means for phase-comparing said first signal with said second signal to produce an output signal having a magnitude representative of information as to said hue.

13. The system of claim 12, in which the magnitude of said output signal varies with hue in substantially the same manner for a number of discretely different hues corresponding to said number of differently colored light producing elements in each of said groups.

14. The system of claim 12, in which said phase-comparing means is operative to produce an output signal having distinctive values in response to representation by said input color-image representing signal of hues substantially the same as those produced by any of said elements of said groups acting alone.

15. The system of claim 14, in which said image-presentation device comprises a cathode-ray tube, said scanning entity comprises the cathode-ray beam of said tube, said elements of each said group comprise stripes responsive to impingement by said beam to present light of different respective primary colors, and said output signal is indicative of times at which said input color-image representing signal is of a phase representing light of substantially the same hue as is produced by one of said stripes acting alone.

16. The system of claim 15, comprising means responsive to said output signal for opposing the speed of forward scanning by said beam to a maximum extent substantially at the center of that stripe presenting light of a given hue when the hue to be produced by that group is substantially that of the stripe being scanned, and for opposing said speed of forward scanning to a maximum extent when scanning substantially the center of each of said stripes when hues different substantially from those of said individual stripes are to be produced by the group being scanned.

17. The system of claim 16, comprising means responsive to said output signal to produce maximum opposition to forward scanning by said beam at substantially the same position near the center of that stripe, in each group, which by itself presents light of the hue then to be presented, over a substantial range of phase of said second signal.

18. In a cathode-ray tube assembly comprising a cathode-ray tube, main deflection yoke means adjacent said tube for producing main deflections of the beam of said tube, and auxiliary deflection yoke means adjacent said main yoke means and adjacent said tube for producing auxiliary deflections of said beam, the improvement wherein said auxiliary deflection means is positioned partly within said main deflection means substantially to cancel currents induced in said auxiliary deflection means by the internal and external magnetic fields produced by said main deflection yoke means.

19. Apparatus for applying, to an auxiliary deflection yoke near a main deflection yoke of a cathode-ray tube, first signals of a first frequency and second signals of a second frequency substantially different from said first frequency, comprising:

- first signal transfer means responsive to first signals of said first frequency to apply them to said yoke;
- second signal transfer means responsive to second signals of said second frequency to apply them to said yoke;
- said first signal transfer means comprising first means for resonating the net inductance of said yoke at said first frequency;
- said second signal transfer means comprising signal means for resonating the net inductance of said yoke at said second frequency.

20. Apparatus in accordance with claim 19, in which said first and second signal transfer means comprise, respectively, first and second amplifying means and first and second DC-blocking capacitor means positioned between each of said amplifying means and said yoke to prevent application of DC currents to said yoke, in which said first resonating means comprises additional capacitive means in series with said first DC-blocking capacitor means, and in which said second resonating means comprises first inductive means effectively in parallel with said yoke for said second signals and effectively in series with said yoke for said first signals, and second inductive means effectively in series with the parallel combination of said yoke and said first inductor for said second signals, the inductance of said first inductive means and said yoke being substantially such as to resonate with the series combination of said first blocking capacitor means and said additional capacitive means at said first frequency, and the parallel combination of the inductance of said yoke and said first inductive means together with said second inductive means being substantially such as to resonate with said second DC-blocking capacitor means.

21. In an image-display system of the class employing a cathode-ray tube comprising a plurality of groups of light-controlling elements scanned sequentially by the cathode-ray beam of said tube, different elements of each of said groups being responsive to impingement by said beam to control light in different respects, the intensity of light from at least one of said elements varying with increases in the energy delivered thereto by said beam, and index elements disposed in predetermined geometric arrangement in said tube and responsive to said beam to produce indexing signals representative of the position of said beam:

the improvement comprising means for modulating the rate of scanning of said beam across at least some of said groups of elements substantially periodically with a period substantially equal to the time which otherwise would be required for said beam to scan across the group being scanned in the absence of said modulation, said geometric arrangement of said index elements being such that the phase of said index signal averaged over several of said groups is not substantially adversely affected by said modulating of the rate of said scanning affected by said modulating of the rate of said scanning, said index elements being positioned so as to be scanned by said beam at a rate which is M/N times the rate of scanning of said groups in the absence of said modulating, where N is an integer and M is an integer greater than N and other than an integral multiple of N.

22. The system of claim 21, in which said means for modulating the rate of scanning comprises means responsive to an input color television signal containing chrominance information and to said indexing signals for producing a third signal, and means responsive to said third signal to effect said modulating of said scanning rate, said system comprising means for causing said input signal also to vary the intensity of said beam, and means responsive to said input signal for reducing the amplitude of said modulating of scanning rate when said input signal represents information which differs substantially in hue from a primary color, said system also comprising means for further modulating said scanning rate with a periodicity substantially equal to the time required for said beam to scan across one of said light-controlling elements being scanned, when said input signal corresponds to information which departs substantially from said primary-color representing phases.

23. A system in accordance with claim 22, comprising means for substantially reducing the extent of said further modulating when the phase of said input signal is in the vicinity of the phase corresponding to said primary-color representing phases.

24. In an image-presentation system comprising a cathode-ray tube, image-forming screen means for said tube, means for scanning said screen means to produce light forwardly of said screen means; and means responsive to an image-representing signal for controlling said scanning means to form an image on said screen means, the improvement comprising:

a plurality of dark elements associated with said screen means, said dark elements producing negligible amounts of light forwardly of said screen means in response to said scanning means compared with other adjacent portions of said screen means, and having a low reflectance for light impinging them from positions forward of said screen means compared with the corresponding reflectance of other adjacent portions of said screen means; and means for varying the rate of said scanning so as to scan said dark elements more rapidly than said adjacent portions of said screen means.

25. In an image-presentation system comprising a cathode-ray tube, image-forming screen means for said tube, means for scanning said screen means to produce light forwardly of said screen means; and means responsive to an image-representing signal for controlling said scanning means to form an image on said screen means, the improvement comprising:

a plurality of dark elements associated with said screen means, said dark elements producing negligible amounts of light forwardly of said screen means in response to said scanning means compared with other adjacent portions of said screen means, and having a low reflectance for light impinging them from positions forward of said screen means compared with the corresponding reflectance of other adjacent portions of said screen means;

means for varying the rate of said scanning so as to scan said dark elements more rapidly than said adjacent portions of said screen means, said tube being a monochrome television tube and said dark elements being in the form of laterally spaced-apart stripes extending transverse to the direction of scanning in said tube, and in which said stripes are regularly spaced from each other, and said means for varying the rate of said scanning comprises means for varying said rate substantially at the frequency of scanning of said stripes and in a phase to increase the scanning times for scanning of said adjacent portions of said screen means.

26. In a color television image-display system comprising a cathode-ray tube having a cathode-ray beam and screen means impinged by said beam, said screen means comprising a plurality of similar groups of light-controlling elements scanned successively by said beam, and index elements positioned to be scanned by said beam for producing index signals indicative of the position of said beam:

means for modulating the speed of said scanning to cause said beam to dwell longer at one position within one of said groups than at other positions within said group;

said index elements being disposed along the direction of said scanning with their centers positioned substantially midway between the centers of the light-controlling elements immediately to each side thereof, each of said index elements being aligned with an area bridging one adjacent pair of said light-controlling elements.

27. In an image-presentation system comprising screen means, means for scanning said screen means with a scanning entity at a predetermined average speed during each scan thereof, index elements associated with said screen means and responsive to said scanning entity to produce a first signal representative of the position of said beam and having a first nominal frequency when said scanning occurs at said average scanning speed, means for deriving from said first signal a corresponding second signal having a second nominal frequency, means for deriving from said first signal a corresponding third signal having a third nominal frequency higher than said second nominal frequency, means for heterodying said second signal with said third signal to produce a corresponding fourth signal having a nominal frequency determined by the difference between said second and third nominal frequencies, means for applying said fourth signal to modulate the speed of said scanning periodically with a periodicity short compared with the time duration of each said scan, and means for causing the transmission time delay for said second signal between the point of its derivation up to the point of said heterodyning to be of such amount that the phase of said modulating is substantially independent of changes in said average speed of scanning.

28. The system of claim 27, comprising means responsive to said second signal and to an input signal containing image-representing information for producing a fifth signal having a fifth nominal frequency and containing said information, additional heterodyning means for heterodyning said fifth signal with said third signal to produce a sixth signal having a sixth nominal frequency and containing said information, means for applying said sixth signal to modulate the intensity of said scanning entity, and means for causing the time delay for said second signal between the point of its derivation up to the point of said heterodyning of said additional heterodyning means to be of such amount that the phase of said modulating of said scanning entity is substantially independent of changes in said average speed of scanning.

29. In an electrical color-image display system, comprising groups of differently-colored light producing elements, means for activating said elements of each group to different extents, a source of an input signal containing information as to the hue of colors to be displayed by said system, and means for controlling said activation of said elements in response to said input signal:

primary detector means responsive to said input signal for producing an output signal which is substantially the same whenever said input signal causes one of said elements in one of said groups to be activated to a much greater extent than any of the other elements of that group.

30. The system of claim 29, in which said output signal is substantially the same whenever said input signal causes one of said elements in one of said groups to be activated to a much greater extent that any of the other elements of that group and said other elements are activated approximately to the same degree.

* * * * *